US012761751B2

(12) United States Patent
Zhang et al.

(10) Patent No.: US 12,761,751 B2
(45) Date of Patent: Oct. 13, 2026

(54) TOUCH DISPLAY PANEL AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Yuanqi Zhang, Beijing (CN); Shun Zhang, Beijing (CN); Yi Zhang, Beijing (CN); Fengli Ji, Beijing (CN); Chang Luo, Beijing (CN); Yang Zeng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 19/207,474

(22) Filed: May 14, 2025

(65) Prior Publication Data

US 2025/0271962 A1 Aug. 28, 2025

Related U.S. Application Data

(63) Continuation of application No. 18/292,358, filed as application No. PCT/CN2021/116538 on Sep. 3, 2021, now Pat. No. 12,411,571.

(51) Int. Cl.
*G06F 3/041* (2006.01)
*G06F 3/044* (2006.01)

(52) U.S. Cl.
CPC ........ *G06F 3/04164* (2019.05); *G06F 3/0443* (2019.05)

(58) Field of Classification Search
CPC .................................................. G06F 3/04164
USPC .......................................................... 345/173
See application file for complete search history.

(56) References Cited

U.S. PATENT DOCUMENTS

2021/0397320 A1* 12/2021 Ye ......................... G06F 3/0448

FOREIGN PATENT DOCUMENTS

CN 105353931 A * 2/2016 ............. G06F 3/044
CN 108388368 A * 8/2018 ........... G06F 3/0412
CN 108845718 A * 11/2018 ............. G06F 3/041

* cited by examiner

*Primary Examiner* — Duane N Taylor, Jr.
(74) *Attorney, Agent, or Firm* — ArentFox Schiff LLP; Michael Fainberg

(57) ABSTRACT

The present disclosure provides a touch display panel and a display device. The touch display panel comprises: a base substrate, comprising a display region and a peripheral region surrounding the display region; and a touch metal layer, comprising touch patterns at least partially of which is in the display region, and touch traces in the peripheral region; wherein: each of the touch pattern comprises a plurality of pattern sub-blocks; at least one floating electrode is provided in each of the plurality of pattern sub-block; a touch pattern, of the touch patterns, with a partial missing region is regarded as a missing touch pattern; and in a pattern sub-block where the missing region is located, the at least one floating electrode is integrally and electrically connected with the pattern sub-block.

18 Claims, 23 Drawing Sheets

TOUCH DISPLAY PANEL AND DISPLAY DEVICE

The present application is a continuation of U.S. patent application Ser. No. 18/292,358, filed on Jan. 26, 2024, which is a National Stage of International Application No. PCT/CN2021/116538, filed Sep. 3, 2021, the entire contents of which are incorporated by reference in the present application.

TECHNICAL FIELD

The present disclosure relates to the field of semiconductor technology, and in particular to a touch display panel and a display device.

BACKGROUND

In a touch panel, a touch position is detected by cross-arranging transmitting electrodes (Tx) and receiving electrodes (Rx) in mutually orthogonal directions on the panel. In the electrode layout scheme of the flexible multiple layer on cell (FMLOC) technology, the Tx electrodes and the Rx electrodes are arranged in the same layer. The Tx electrodes and the Rx electrodes form a pattern unit, and the touch position is determined by monitoring changes in the electrical parameters of the pattern unit.

SUMMARY

Embodiments of the present disclosure provide a touch display panel, including: a base substrate, including a display region and a peripheral region surrounding the display region; and a touch metal layer, including touch patterns at least partially of which is in the display region, and touch traces in the peripheral region; wherein: each of the touch pattern includes a plurality of pattern sub-blocks; at least one floating electrode is provided in each of the plurality of pattern sub-block; a touch pattern, of the touch patterns, with a partial missing region is regarded as a missing touch pattern; and in a pattern sub-block where the missing region is located, the at least one floating electrode is integrally and electrically connected with the pattern sub-block; in one touch pattern, the pattern sub-block is provided with a plurality of protrusions on an edge of the pattern sub-block toward another pattern sub-block; and the plurality of protrusions include a first convex block and a second convex block arranged sequentially in a direction perpendicular to the edge; where a width of the second convex block in a direction parallel to the edge is smaller than a width of the first convex block in the direction parallel to the edge.

In one possible implementation, the plurality of pattern sub-blocks include two first pattern sub-blocks arranged in sequence along a first direction and electrically connected with each other, and two second pattern sub-blocks arranged in sequence along a second direction and electrically connected with each other; first pattern sub-blocks of different touch patterns in a same arrangement direction parallel to the first direction are electrically connected to form a first touch electrode; and second pattern sub-blocks of different touch patterns in a same arrangement direction parallel to the second direction are electrically connected to form a second touch electrode.

In one possible implementation, in the missing touch pattern, a pattern in an edge region at a side of a first pattern sub-block facing away from the other first pattern sub-block is missing; and in the first pattern sub-block where the missing region is located, the at least one floating electrode is integrally and electrically connected with the first pattern sub-block.

In one possible implementation, in the missing touch pattern, a pattern in an edge region at a side of the second pattern sub-block facing away from the other second pattern sub-block is missing; and in the second pattern sub-block where the missing region is located, the at least one floating electrode is integrally and electrically connected with the second pattern sub-block.

In one possible implementation, in the missing touch pattern, a corner region at the side of the first pattern sub-block facing away from the other first pattern sub-block is missing, or, a corner region at the side of the second pattern sub-block facing away from the other second pattern sub-block is missing; and in the first pattern sub-block where the corner region is missing, the at least one floating electrode is integrally and electrically connected with the first pattern sub-block; and in the second pattern sub-block where the corner region is missing, the at least one floating electrode is integrally and electrically connected with the second pattern sub-block.

In one possible implementation, the peripheral region includes a plurality of edges; the plurality of edges includes: a first edge and a second edge extending along the first direction, a third edge extending along the second direction and connected with one end of the first edge and one end of the second edge, and a fourth edge extending along the second direction and connected with the other end of the first edge and the other end of the second edge; the touch display panel includes a plurality of missing touch patterns adjacent to at least one edge, and the plurality of missing touch patterns are arranged sequentially along the at least one edge adjacent to the plurality of missing touch patterns; missing regions in different missing touch patterns are arranged sequentially along the at least one edge adjacent to the different missing touch patterns.

In one possible implementation, the touch display panel includes a plurality of missing touch patterns adjacent to the first edge; the plurality of missing touch patterns are arranged in sequence along the first direction; and the missing regions in different missing touch patterns are arranged in sequence along the first direction.

In one possible implementation, the touch display panel includes a plurality of missing touch patterns adjacent to the second edge; the plurality of missing touch patterns are arranged in sequence along the first direction; and the missing regions in different missing touch patterns are arranged in sequence along the first direction.

In one possible implementation, the touch display panel includes a plurality of missing touch patterns adjacent to the third edge; the plurality of missing touch patterns are arranged in sequence along the second direction; and the missing regions in different missing touch patterns are arranged in sequence along the second direction.

In one possible implementation, the touch display panel includes a plurality of missing touch patterns adjacent to the fourth edge; the plurality of missing touch patterns are arranged in sequence along the second direction; and the missing regions in different missing touch patterns are arranged in sequence along the second direction.

In one possible implementation, the touch display panel includes a first corner at an intersection of the first edge and the third edge; and a missing touch pattern adjacent to the first corner.

In one possible implementation, the touch display panel includes a second corner at an intersection of the first edge and the fourth edge; and a missing touch pattern adjacent to the second corner.

In one possible implementation, the touch display panel includes a third corner at an intersection of the second edge and the third edge; and a missing touch pattern adjacent to the third corner.

In one possible implementation, the touch display panel includes a fourth corner at an intersection of the second edge and the fourth edge; and a missing touch pattern adjacent to the fourth corner.

In one possible implementation, the touch display panel includes a through hole; a missing touch pattern adjacent to the through hole; wherein in the missing touch pattern adjacent to the through hole, one first pattern sub-block is entirely missing, and partial region of two second pattern sub-blocks are missing; and in the second pattern sub-block where the missing region is located, the at least one floating electrode is integrally and electrically connected with the second pattern sub-block.

In one possible implementation, the touch display panel includes a first compensation ring located between the missing touch pattern and the through hole and surrounding the through hole; and the first compensation ring is electrically connected with first pattern sub-blocks on both sides of the through hole.

In one possible implementation, the touch display panel includes a second compensation ring located between the first compensation ring and the missing touch pattern and surrounding the through hole; and the second compensation ring is electrically connected with second pattern sub-blocks on both sides of the through hole.

In one possible implementation, the touch trace includes a first touch trace electrically connected with the first touch electrode, and a second touch trace electrically connected with the second touch electrode.

In one possible implementation, the touch display panel includes a ground line and a shielded signal line in the peripheral region; wherein the shielded signal line is located at one or a combination of following locations: between the first touch trace and the second touch trace; between the first touch trace and the ground line; or between the second touch trace and the ground line.

In one possible implementation, in the touch pattern other than the missing touch patterns, the at least one floating electrode and the plurality of pattern sub-blocks are insulated from each other.

In one possible implementation, an outer outline of the pattern sub-block is a first triangle; each of the plurality of pattern sub-blocks includes a plurality of floating electrodes; connecting lines between centers of the plurality of floating electrodes form a second triangle, and sides of the first triangle and sides of the second triangle are approximately parallel.

In one possible implementation, a proportion of an area of a missing region of the missing touch pattern to an area of the missing touch pattern is greater than 0 and less than or equal to 40%.

Embodiments of the present disclosure also provide a display device, which includes the touch display panel provided by the embodiments of the present disclosure.

DETAILED DESCRIPTION

In order to make the purpose, technical solutions and advantages of the embodiments of the present disclosure more clear, the technical solutions of the embodiments of the present disclosure will be clearly and completely described below in conjunction with the drawings of the embodiments of the present disclosure. Apparently, embodiments described are some rather than all of embodiments of the present disclosure. All the other embodiments derived by a person of ordinary skill in the art from the described embodiments of the present disclosure without creative efforts shall fall within the protection scope of the present disclosure.

Unless otherwise defined, technical terms or scientific terms used in the present disclosure should have ordinary meanings as understood by those of ordinary skill in the art to which the present disclosure belongs. "First", "second" and similar words used in the disclosure do not indicate any order, quantity or importance, but are only used to distinguish different components. "Including", "comprising", and other similar words used in the present disclosure indicate that elements or objects before the word include elements or objects after the word and their equivalents, without excluding other elements or objects. "Connected" or "coupled" are not limited to physical or mechanical connections, but may include electrical connections, whether direct or indirect. "Up", "down", "left", "right", etc. are only used to express relative positional relationships. When the absolute position of the described object changes, the relative positional relationship may also change accordingly.

In order to keep the following description of the embodiments of the present disclosure clear and concise, the present disclosure omits detailed descriptions of well-known functions and components.

In a touch panel, the integrity of the electrode pattern directly affects the electrical parameters of the pattern. Factors such as screen display region size, pixel size, touch pattern unit size, and through holes in the screen will affect the integrity of the electrode pattern at the edge of the screen. Normally, the electrode pattern at the edge is not complete, which will affect the touch performance.

Figure 1A:
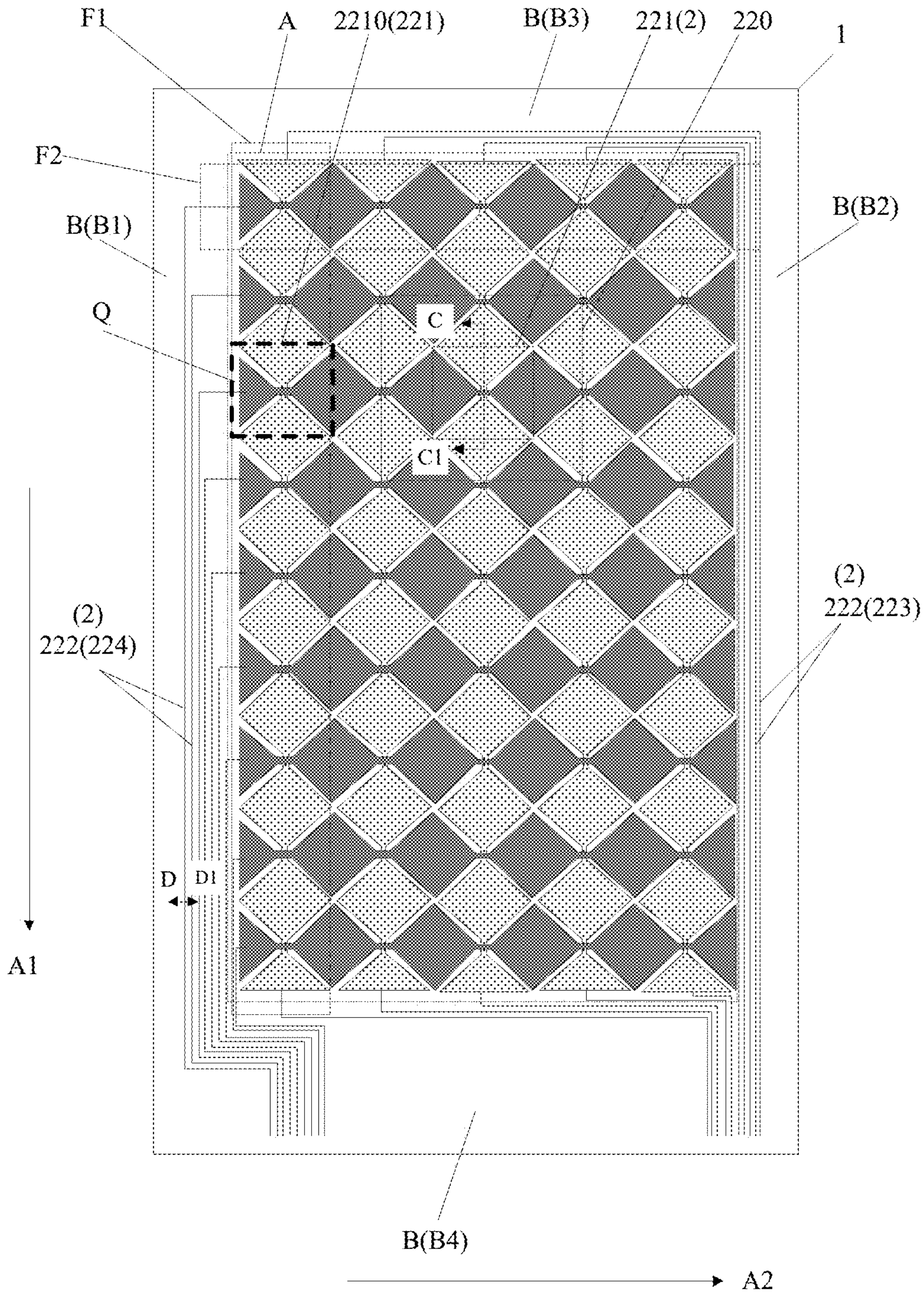
FIG. 1A is a first structural schematic diagram of a touch display panel provided by an embodiment of the present disclosure.
Figure 2:
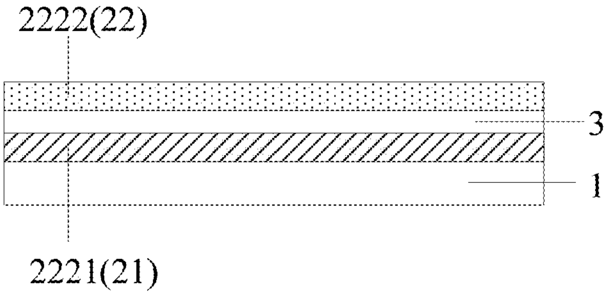
FIG. 2 is a schematic cross-sectional view along a dotted line D-D1 in FIG. 1A.
Figure 3A:
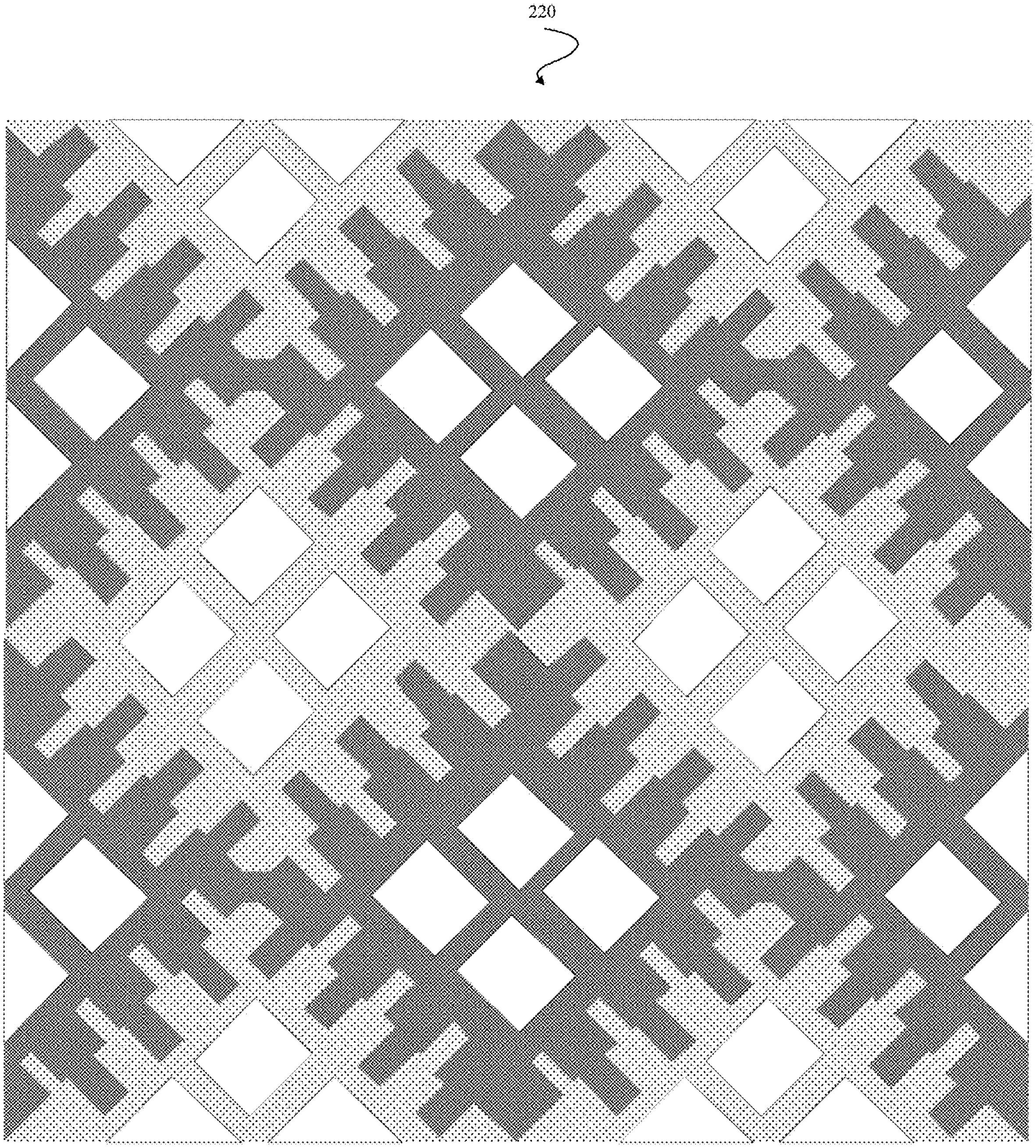
FIG. 3A is an enlarged schematic diagram of a dotted box 220 in FIG. 1A.
Figure 3B:
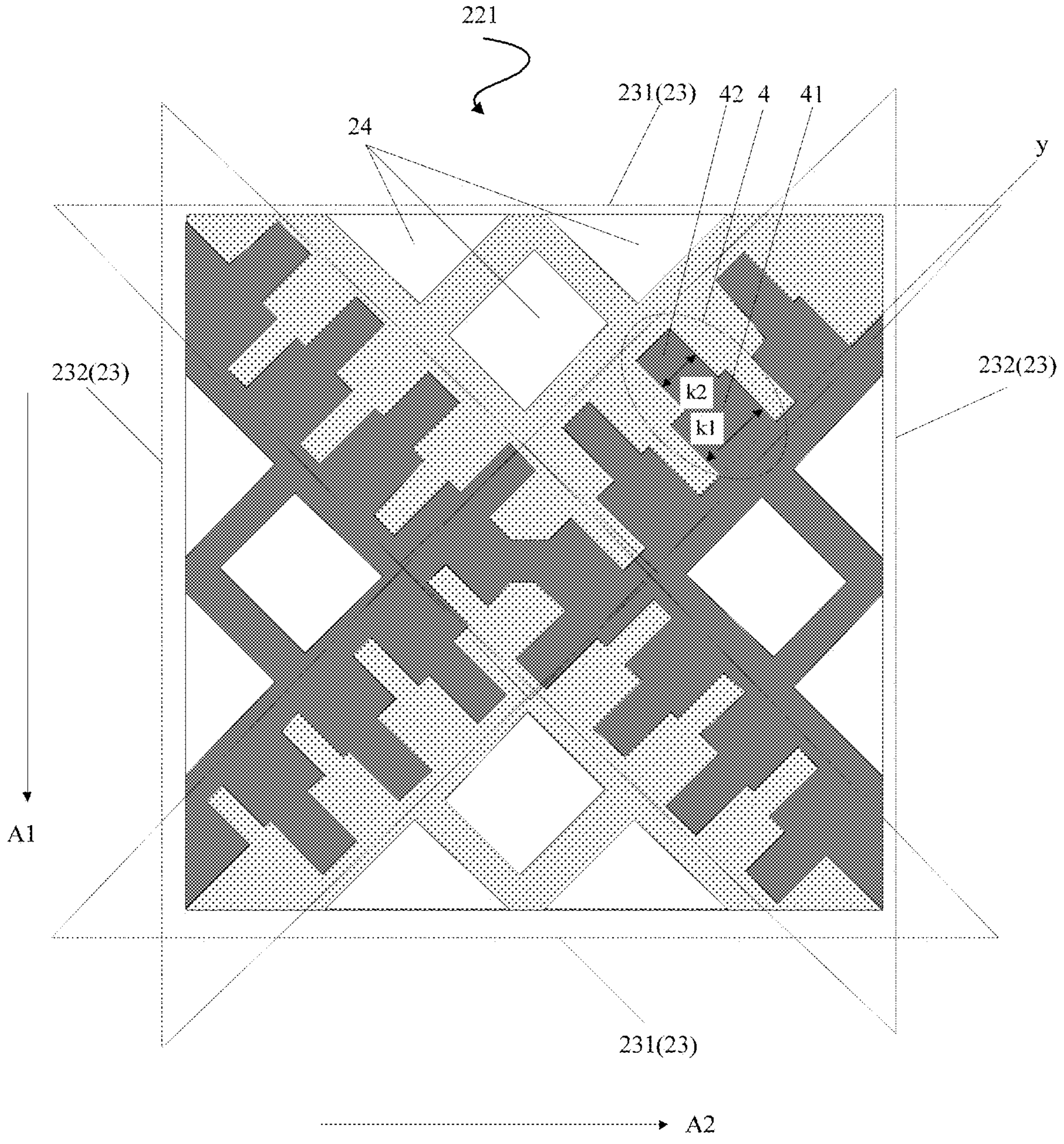
FIG. 3B is an enlarged schematic diagram of a touch pattern that does include a missing region in FIG. 1A.
Figure 4:
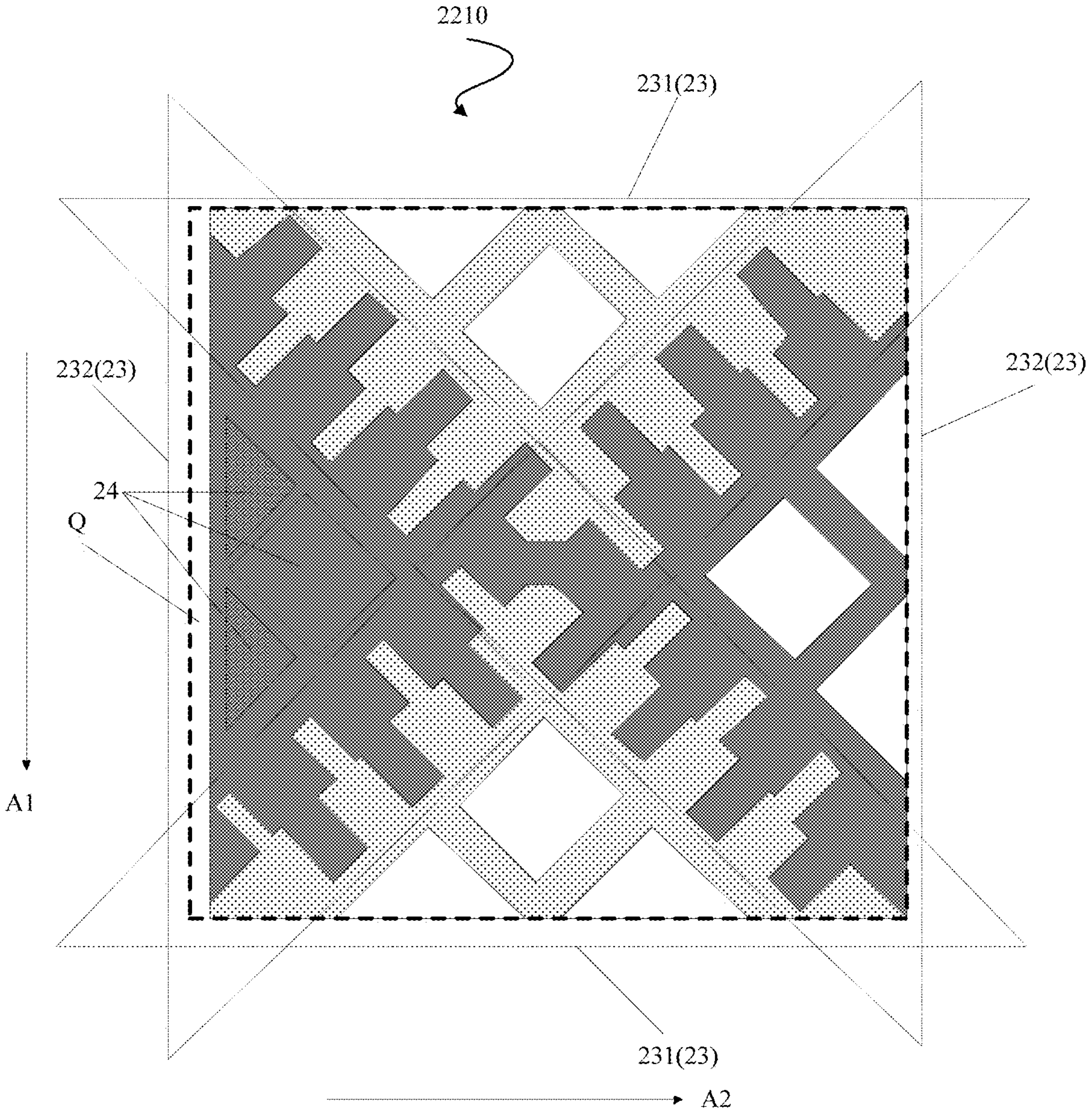
FIG. 4 is an enlarged schematic diagram of a missing touch pattern in FIG. 1A.

In view of this, please refer to FIG. 1A, FIG. 2, FIG. 3A, FIG. 3B and FIG. 4; where FIG. 2 is a schematic cross-sectional view along the dotted line D-D1 in FIG. 1A; FIG. 3A is an enlarged schematic diagram of a dotted box 220 in FIG. 1A; FIG. 3B is an enlarged schematic diagram of the touch pattern 221 without a missing region in FIG. 1A; and FIG. 4 is an enlarged schematic diagram of the touch pattern 221 with the missing region in FIG. 1A. Embodiments of the present disclosure provide a touch display panel, including: a base substrate 1, including a display region A and a peripheral region B surrounding the display region A; and a touch metal layer 2, where the touch metal layer 2 includes touch patterns 221 at least partially of which is in the display region A and touch traces 222 in the peripheral region B. The touch pattern 221 includes a plurality of pattern sub-blocks 23. At least one floating electrode 24 is provided in the pattern sub-block 23. A touch pattern 221 with a partial missing region Q is regarded as a missing touch pattern 2210. In the pattern sub-block 23 where the missing region Q is located, at least one floating electrode 24 is integrally and electrically connected with the pattern sub-block 23. In some embodiments, as shown in FIG. 4, the pattern sub-block 23 on the left side of the missing touch pattern 2210 (that is, the side close to the peripheral region B) has a missing region Q, then the floating electrode 24 in the pattern sub-block 23 on the left side can be integrally and electrically connected with the pattern sub-block 23. Specifically, the touch metal layer 2 may include touch patterns 221 in the display region A, and touch patterns 221 on the periphery of the display region A. That is, the touch pattern(s) 221 may have a portion beyond the AA edge to ensure better touch effect.

In embodiments of the present disclosure, for the touch pattern 221 with the partial missing region Q, at least one floating electrode 24 is electrically and integrally connected with the pattern sub-block 23 to compensate for the effective area of the touch pattern 221 on the edge, which can improve the self-capacitance of the missing touch pattern 2210 which is incomplete, optimize the electrical parameters of the missing touch pattern 2210 at the screen edge, and improve the touch performance of the screen edge. The self-capacitance can be understood as the capacitance of the missing touch pattern 2210 to ground.

Specifically, the floating electrode 24 can be understood as a structure that only provides an electrode pattern and does not load an electrical signal on the electrode pattern during use. In embodiments of the present disclosure, after the floating electrode(s) 24 is integrally and electrically connected with the pattern sub-block 23, the floating electrode 24 becomes an integral structure with the pattern sub-block 23, and can be loaded with the same signal as the pattern sub-block 23. However, the floating electrode(s) 24, which is not integrally and electrically connected with the pattern sub-block 23, can still maintain the original function of the floating electrode, that is, only the electrode pattern is set, and no electrical signal is loaded during use.

Figure 1B:
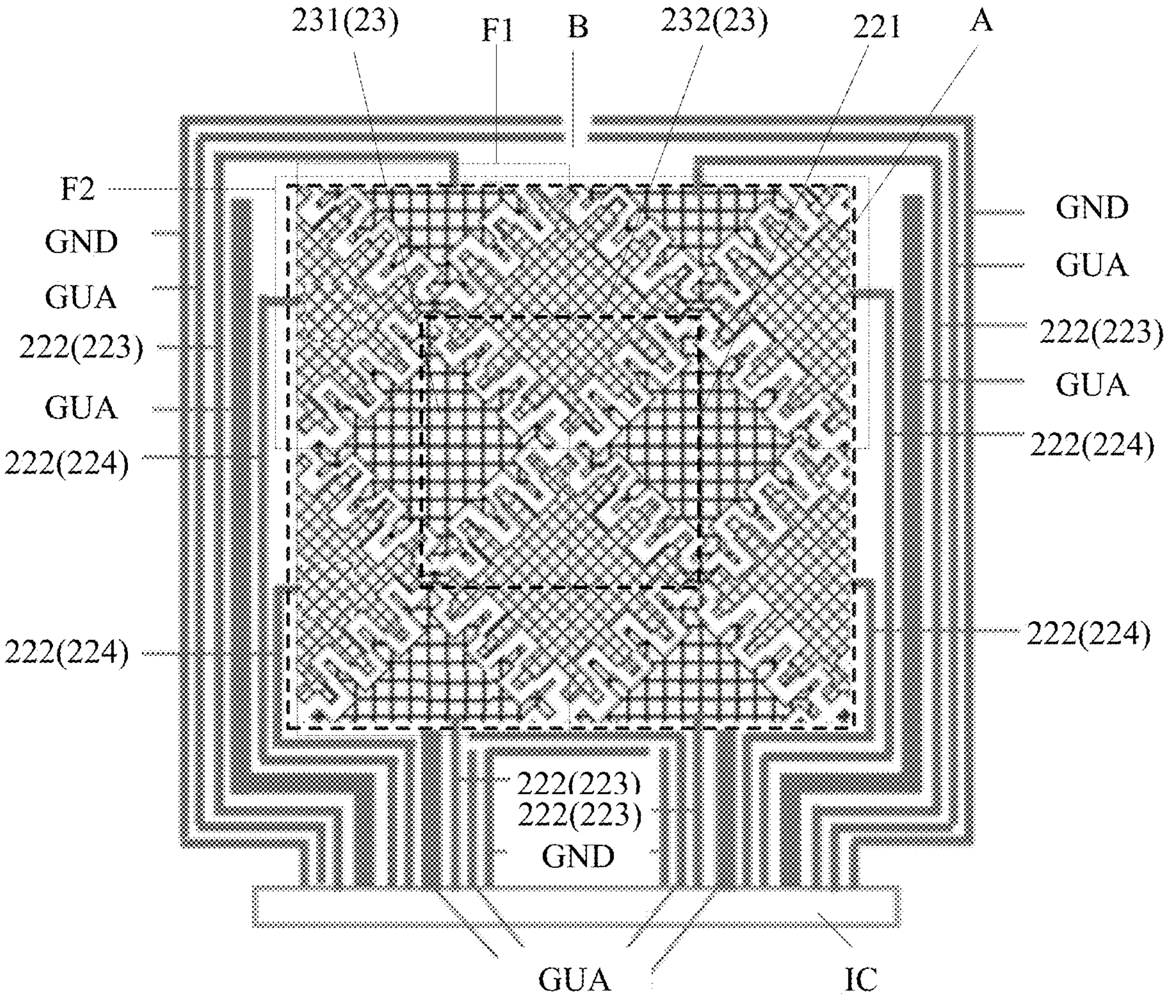
FIG. 1B is a second structural schematic diagram of a touch display panel provided by an embodiment of the present disclosure.

In one possible implementation, as shown in FIGS. 1A and 1B, in a direction parallel to the first direction A1, the first pattern sub-blocks 231 of different touch patterns 221 in the same arrangement direction are electrically connected to form a first touch electrode F1. In a direction parallel to the second direction A2, the second pattern sub-blocks 232 of different touch patterns 221 in the same arrangement direction are electrically connected to form a second touch electrode F2. Specifically, the first touch electrode F1 may be the transmitting electrode Tx, and the second touch electrode F2 may be the receiving electrode Rx. The first touch electrode F1 and the second touch electrode F2 are in the same layer and are insulated from each other. In the embodiments of the present disclosure, the mutually capacitive touch structure may be formed by the first touch electrode F1 and the second touch electrode F2.

In one possible implementation, as shown in FIGS. 1A and 1B, the touch traces 222 include the first touch trace 223 electrically connected with the first touch electrode F1, and the second touch trace 224 electrically connected with the second touch electrode F2.

In one possible implementation, as shown in FIG. 3A, the touch metal layer 2 includes: a first touch metal layer 21 and a second touch metal layer 22 on a side of the first touch metal layer 21 facing away from the base substrate 1. The touch patterns 221 may be located in the second metal layer 22; the touch traces 222 may include a first touch sub-trace(s) 2221 and a second touch sub-trace(s) 2222 arranged in a stack. In some embodiments, the first touch sub-trace(s) 2221 may be located in the first touch metal layer 21, and the second touch sub-trace(s) 2222 may be located in the second touch metal layer 22.

Specifically, an area of an orthographic projection of the missing touch pattern 2210 on the base substrate 1 is smaller than an area of an orthographic projection of the normal touch pattern 221 without missing on the base substrate 1.

In the specific implementation, the missing region Q may be located at different positions of the missing touch pattern 2210. Accordingly, the floating electrodes 24 at different positions need to be electrically connected with the corresponding pattern sub-blocks 23, which will be described in detail below.

Figure 5:
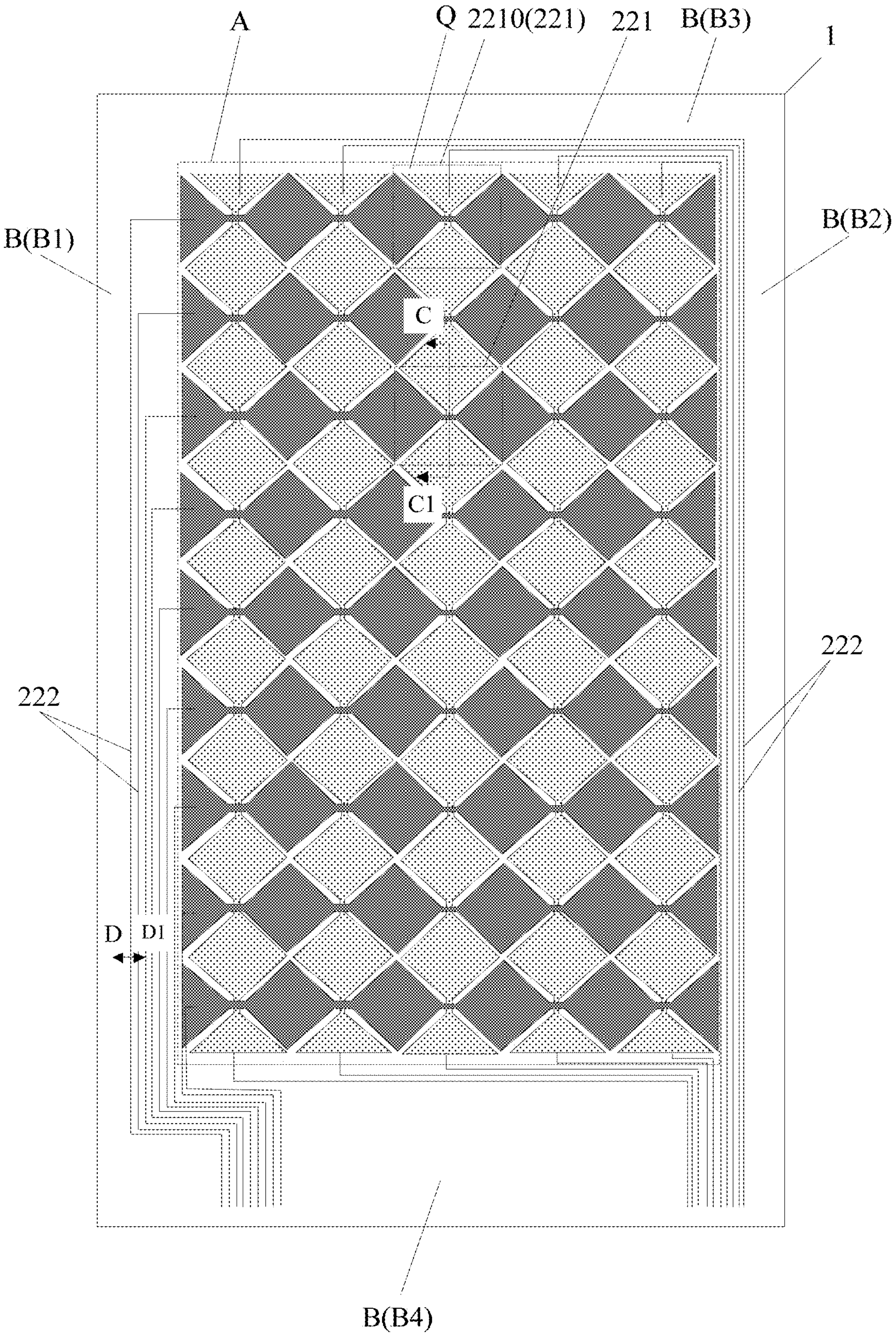
FIG. 5 is a third structural schematic diagram of a touch display panel provided by an embodiment of the present disclosure.
Figure 6:
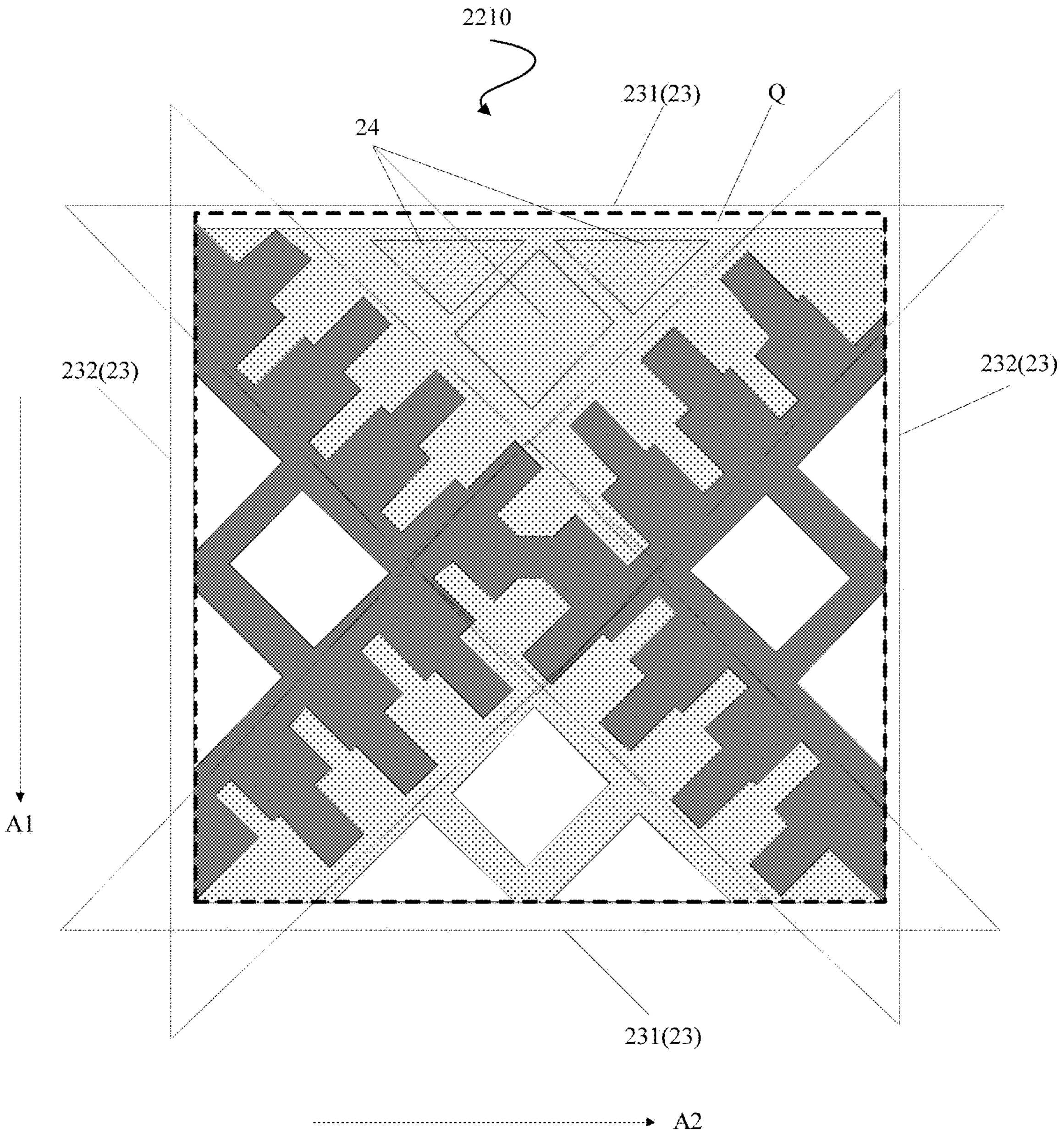
FIG. 6 is an enlarged schematic diagram of a missing touch pattern in FIG. 5.
Figure 9:
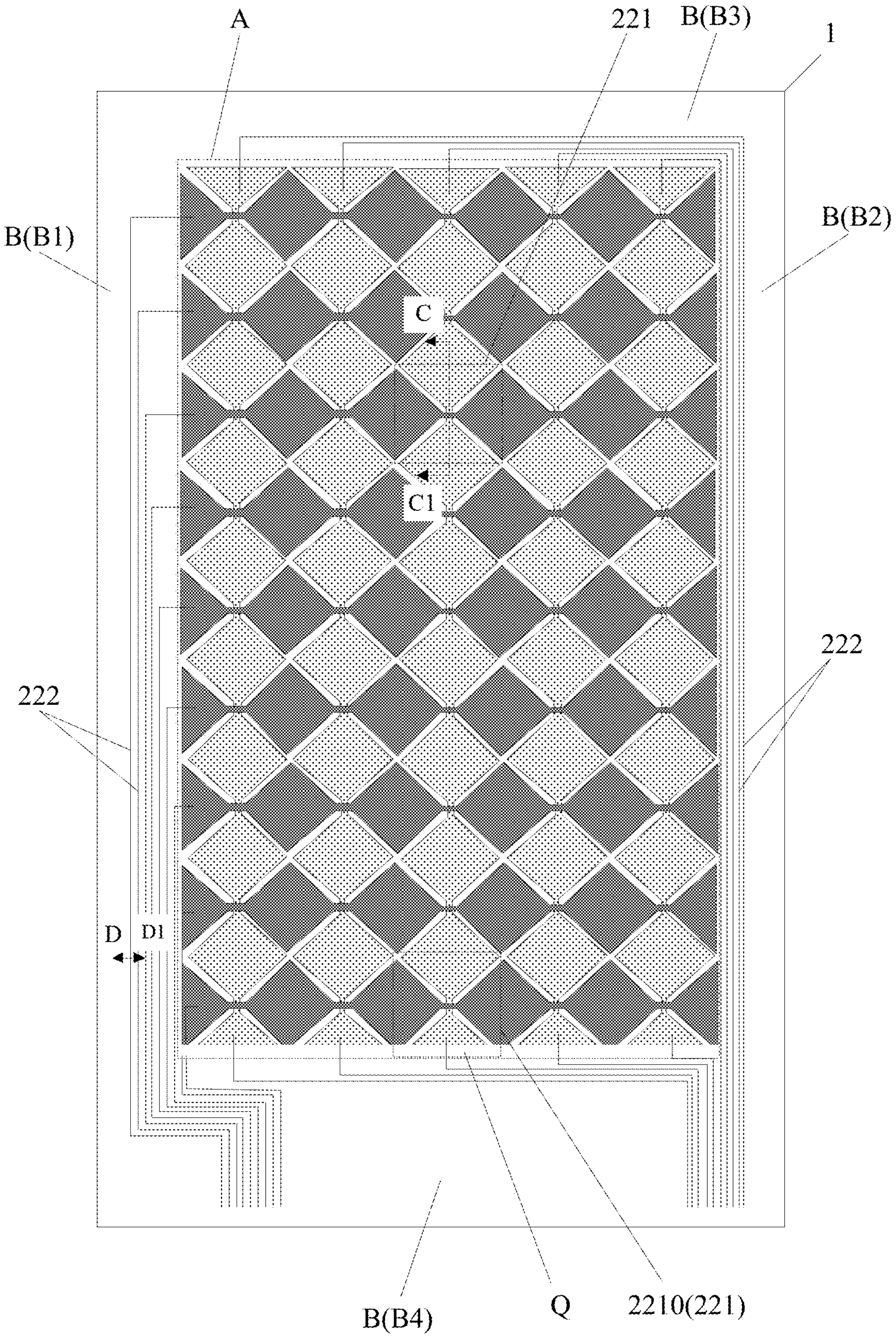
FIG. 9 is a fifth structural schematic diagram of a touch display panel provided by an embodiment of the present disclosure.
Figure 10:
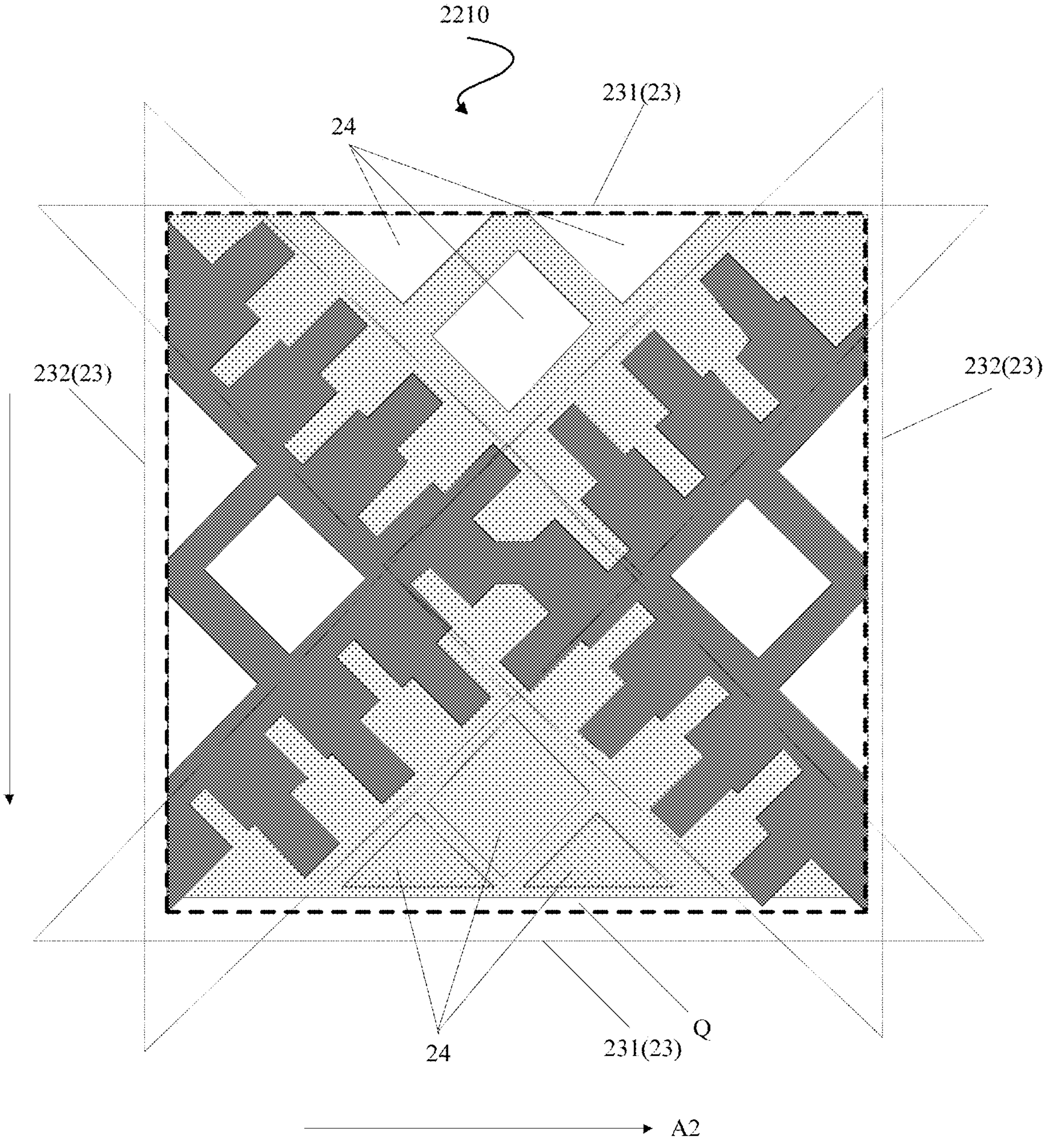
FIG. 10 is an enlarged schematic diagram of a missing touch pattern in FIG. 9.

In one possible implementation, the missing touch pattern 2210 is located at the upper edge of the touch display panel, as shown in FIG. 5 and FIG. 6, where FIG. 6 is an enlarged schematic diagram of a missing touch pattern 2210 on the upper edge side of the touch display panel in FIG. 5. Or, the missing touch pattern 2210 is located at the lower edge of the touch display panel, as shown in FIG. 9 and FIG. 10, where FIG. 10 is an enlarged schematic diagram of a missing touch pattern 2210 on the lower edge side of the touch display panel in FIG. 9. Specifically, as shown in FIG. 6 and FIG. 10, within the missing touch pattern 2210, the plurality of pattern sub-blocks 23 include two first pattern sub-blocks 231 that are arranged in sequence along a first direction A1 and electrically connected with each other, and two second pattern sub-blocks 232 that are arranged in sequence along a second direction A2 and electrically connected with each other. A pattern in an edge region at the side of one first pattern sub-block 231 facing away from the other first pattern sub-block 231 is missing. Within the first pattern sub-block 231 where the missing region Q is located, at least one floating electrode 24 is integrally and electrically connected with the first pattern sub-block 231. Specifically, for example, as shown in FIG. 6, if a pattern missing is in the edge region at the side of the upper first pattern sub-block 231 facing away from the lower first pattern sub-block 231, then in the upper first pattern sub-block 231 where the missing region Q is located, at least one floating electrode 24 is integrally and electrically connected with the first pattern sub-block 231. For another example, as shown in FIG. 10, if a pattern missing is in the edge region at the side of the lower first pattern sub-block 231 facing away from the upper first pattern sub-block 231, then in the lower first pattern sub-block 231 including the missing region Q, at least one floating electrode 24 is electrically and integrally connected with the first pattern sub-block 231. Specifically, within the first pattern sub-block 231 where the missing region Q is located, there may be one floating electrode 24 integrally and electrically connected with the first pattern sub-block 231, or there may be two floating electrodes 24 integrally and electrically connected with the first pattern sub-block 231, or there may be all floating electrodes 24 are integrally and electrically connected with the first pattern sub-block 231.

Figure 7:
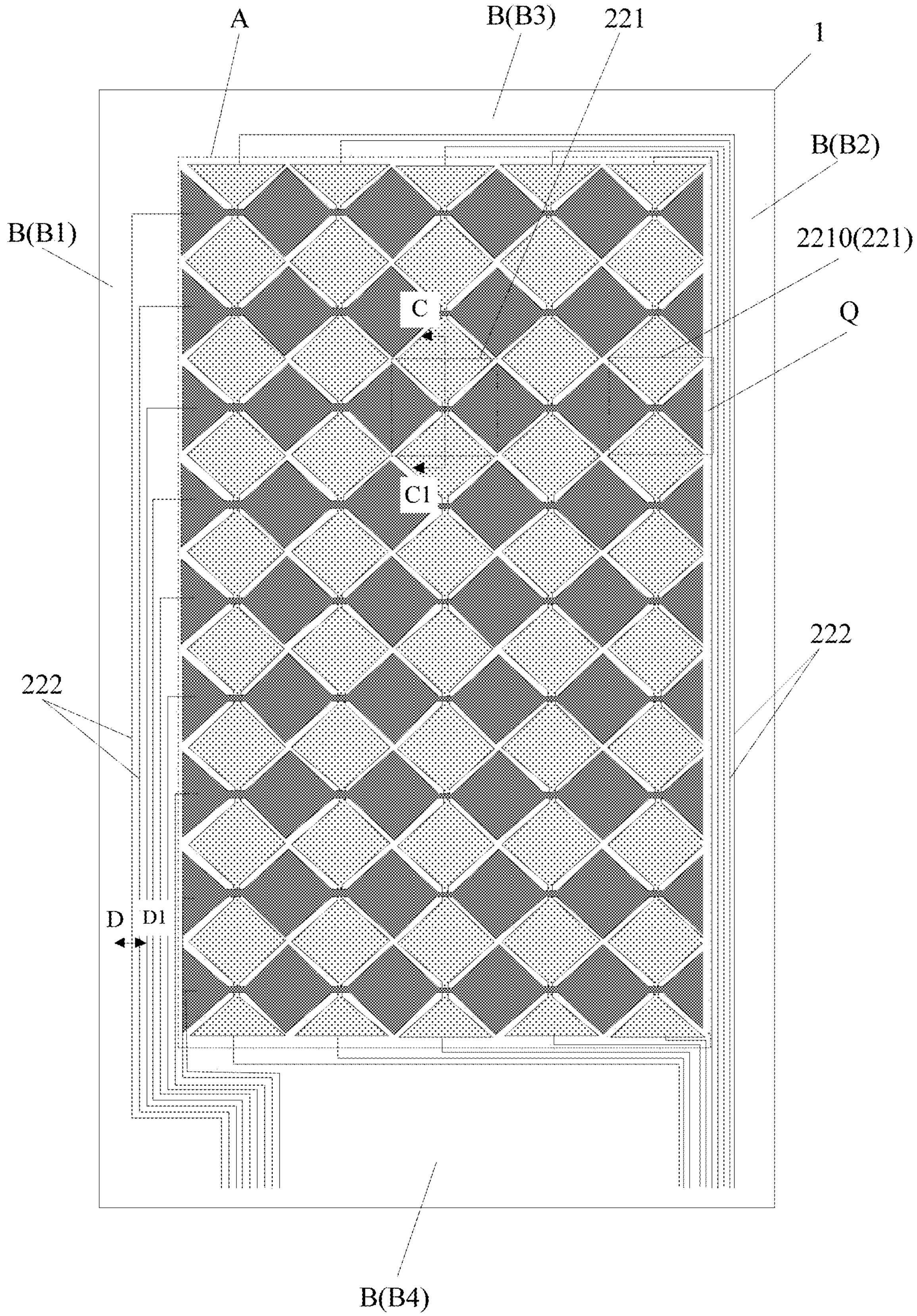
FIG. 7 is a fourth structural schematic diagram of a touch display panel provided by an embodiment of the present disclosure.
Figure 8:
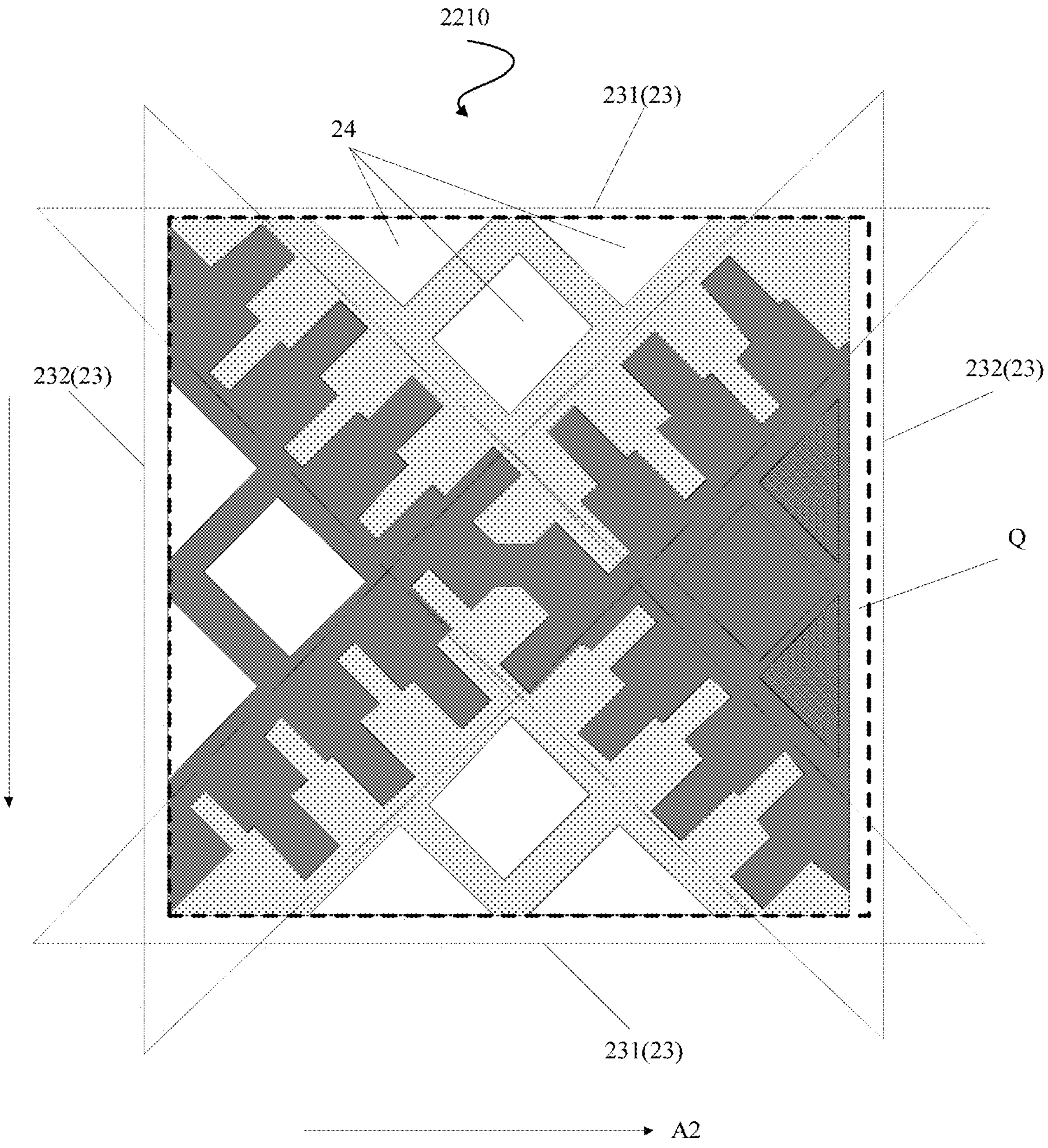
FIG. 8 is an enlarged schematic diagram of a missing touch pattern in FIG. 7.

In one possible implementation, the missing touch pattern 2210 is located at the left edge of the touch display panel, as shown in FIG. 1A and FIG. 4, where FIG. 4 shows an enlarged schematic diagram of the missing touch pattern 2210 at the left edge side of the touch display panel in FIG. 1A; or, the missing touch pattern 2210 is located at the right edge of the touch display panel, as shown in FIG. 7 and FIG. 8, where FIG. 8 is an enlarged schematic diagram of a missing touch pattern 2210 at the right edge side of the touch display panel in FIG. 7. Specifically, as shown in FIG. 4 and FIG. 8, in the missing touch pattern 2210, the missing region Q is located in the second pattern sub-block 232, and a pattern in an edge region at the side of one second pattern sub-block 232 facing away from the other second pattern sub-block 232 is missing. In the second pattern sub-block 232 where the missing region Q is located, at least one floating electrode 24 is integrally and electrically connected with the second pattern sub-block 232. Specifically, for example, as shown in FIG. 4, if a pattern missing is in the edge region at the side of the left second pattern sub-block 232 facing away from the right second pattern sub-block 232, then in the left second pattern sub-block 232 where the missing region Q is located, at least one floating electrode 24 is integrally and electrically connected with the second pattern sub-block 232. For another example, as shown in FIG. 8, if a pattern missing is in the edge region at the side of the right second pattern sub-block 232 facing away from the left second pattern sub-block 232, and in the right second pattern sub-block 232 where the missing region Q is located, at least one floating electrode 24 is electrically and integrally connected with the second pattern sub-block 232. Specifically, in the second pattern sub-block 232 where the missing region Q is located, there may be one floating electrode 24 integrally and electrically connected with the second pattern sub-block 232, or there may be two floating electrodes 24 integrally and electrically connected with the second pattern sub-block 232, or there may be all floating electrodes 24 are integrally and electrically connected with the second pattern sub-block 232.

Figure 11A:
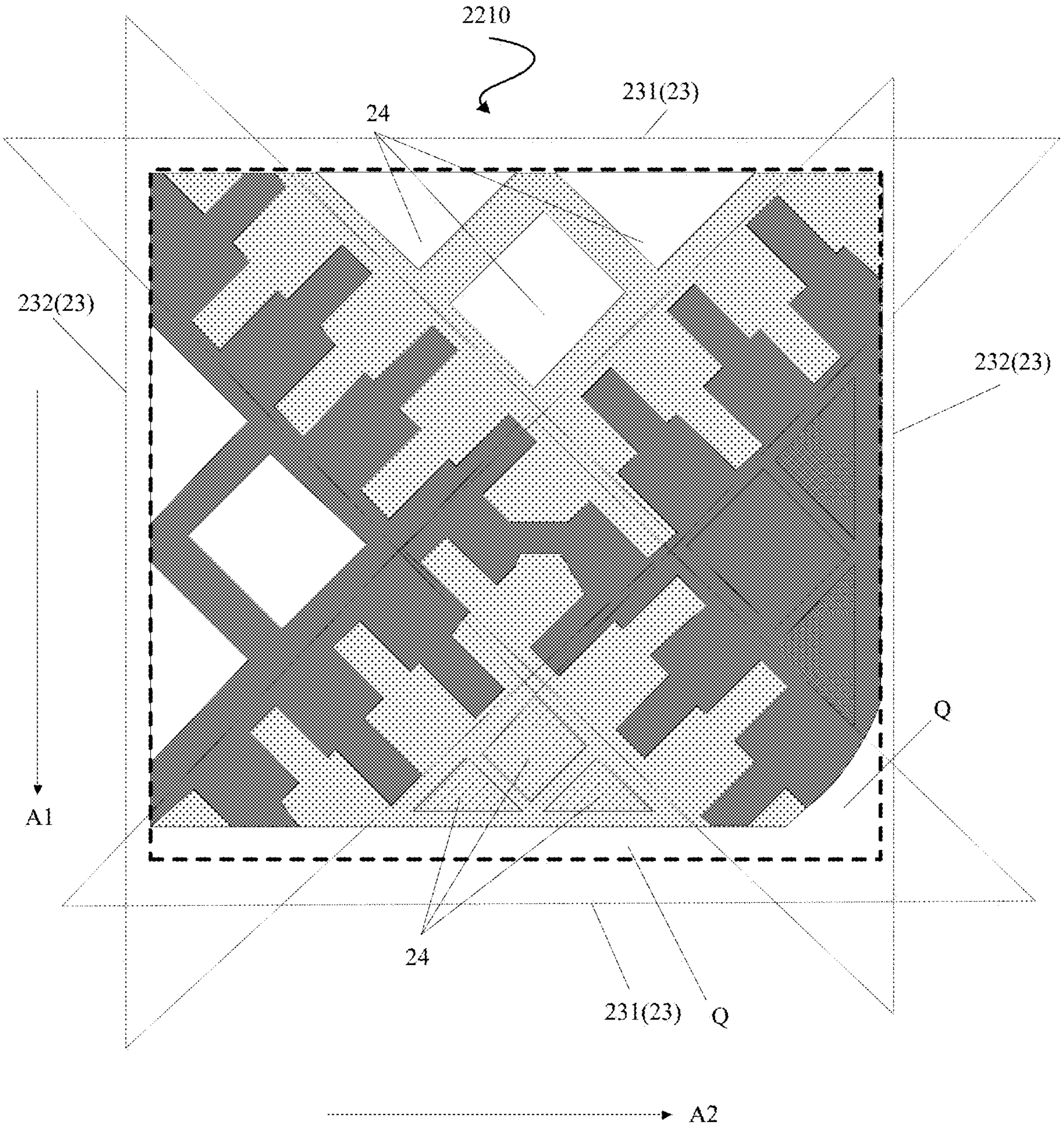
FIG. 11A is a schematic diagram of a missing touch pattern at a lower right corner of a touch display panel.

In one possible implementation, the missing touch pattern 2210 is located at the edge region and corner region of the touch display panel. As shown in FIGS. 11A to 11H, within the missing touch pattern 2210, a pattern in the corner region at the side of one first pattern sub-block 231 facing away from the other first pattern sub-block 231 is missing, or a pattern in the corner region at the side of one second pattern sub-block 232 facing away from the other second pattern sub-block 232 is missing. In the first pattern sub-block 231 where the missing corner region is located, at least one floating electrode 24 is integrally and electrically connected with the first pattern sub-block 231. In the second pattern sub-block 232 where the missing corner region is located, at least one floating electrode 24 is integrally and electrically connected with the second pattern sub-block 232. Specifically, for example, as shown in FIGS. 11A and 11H, the missing touch pattern 2210 is located at the lower edge region and the lower right corner region of the touch display panel. A pattern missing is in the edge region at the side of the lower first pattern sub-block 231 facing away from the upper first pattern sub-block 231, and a pattern missing in the corner region at the side of of the right second pattern sub-block 232 facing away from the left second pattern sub-block 232, then in the lower first pattern sub-block 231 where the missing region is located, at least one floating electrode 24 is integrally and electrically connected with the first pattern sub-block 231, and in the right second pattern sub-block 232 where the corner missing region is located, at least one floating electrode 24 is integrally and electrically connected with the second pattern sub-block 232. In this way, the effective area of the missing touch pattern 2210 in the corner region can be compensated, and the self-capacitance of the missing touch pattern 2210 in the corner region can be increased, thereby optimizing the electrical parameters of the missing touch pattern 2210 in the corner region, improve the touch performance in the corner regions of the screen.

In one possible implementation, as shown in FIG. 1A, the peripheral region B includes a plurality of edges. The plurality of edges include: a first edge B1 and a second edge B2 extending along the first direction A1, a third edge B3 extending along the second direction A2 and connected with one end of the first edge B1 and one end of the second edge B2, and a fourth edge B4 extending along the second direction A2 and connected with the other end of the first edge B1 and the other end of the second edge B2. The touch display panel includes a plurality of missing touch patterns 2210 adjacent to at least one edge, and the plurality of missing touch patterns 2210 are arranged sequentially along the edge(s) adjacent to the plurality of missing touch patterns. The detailed descriptions are as follows.

In one possible implementation, as shown in FIG. 1A, the touch display panel includes a plurality of missing touch patterns 2210 adjacent to the first edge B1; the plurality of missing touch patterns 2210 are arranged in sequence along the first direction A1; and the missing regions Q in different missing touch patterns 2210 are arranged in sequence along the first direction A1.

In one possible implementation, as shown in FIG. 7, the touch display panel includes a plurality of missing touch patterns 2210 adjacent to the second edge B2; the plurality of missing touch patterns 2210 are arranged in sequence along the first direction A1; and the missing regions in different missing touch patterns 2210 are arranged in sequence along the first direction A1.

In one possible implementation, as shown in FIG. 5, the touch display panel includes a plurality of missing touch patterns 2210 adjacent to the third edge B3; the plurality of missing touch patterns 2210 are arranged in sequence along the second direction A2; and the missing regions Q in different missing touch patterns 2210 are arranged in sequence along the second direction.

In one possible implementation, as shown in FIG. 9, the touch display panel includes a plurality of missing touch patterns 2210 adjacent to the fourth edge B4; the plurality of missing touch patterns 2210 are arranged in sequence along the second direction A2; and the missing regions Q in different missing touch patterns 2210 are arranged in sequence along the second direction A2.

Figure 11B:
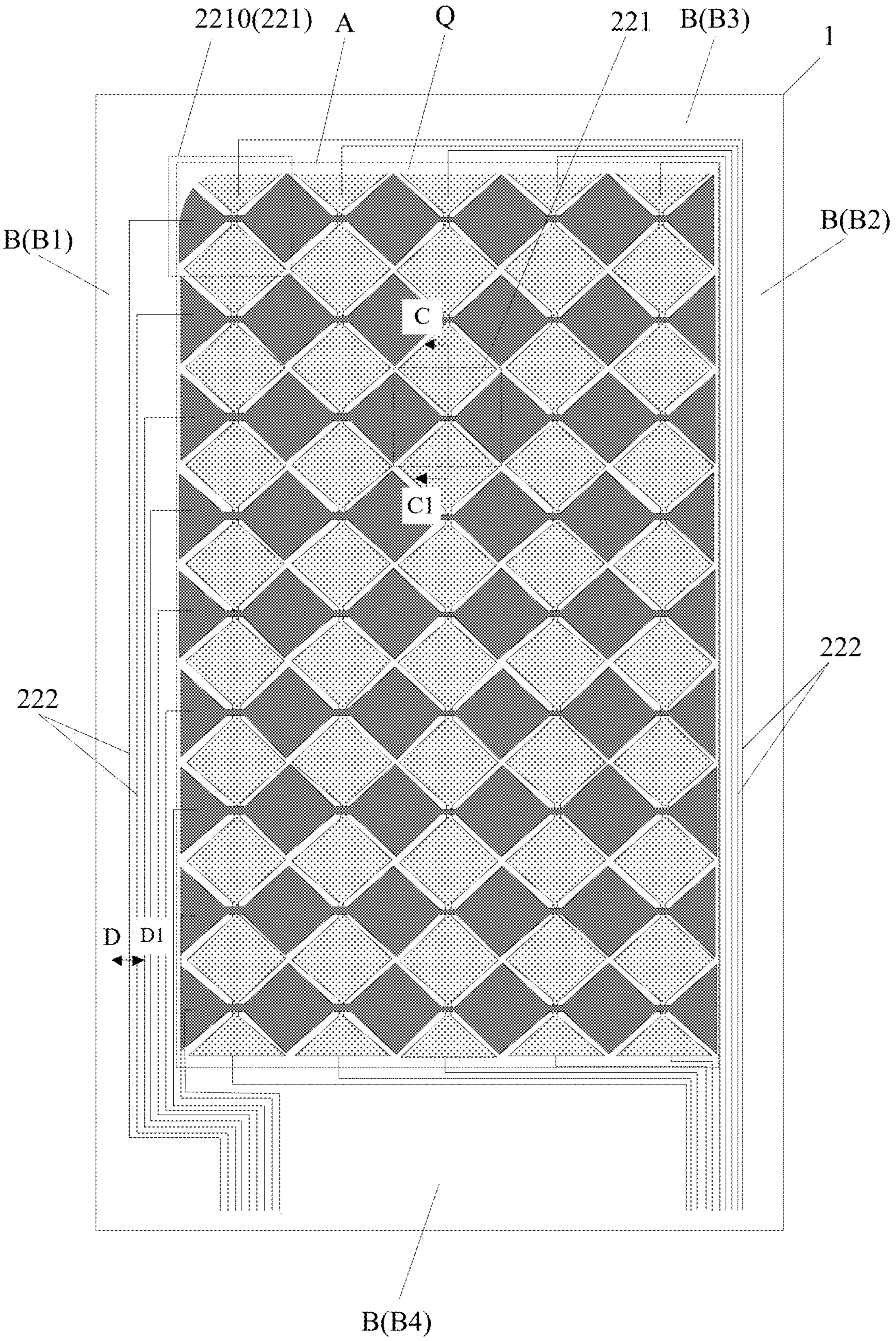
FIG. 11B is an overall schematic diagram of a missing touch pattern at an upper left corner of a touch display panel.
Figure 11C:
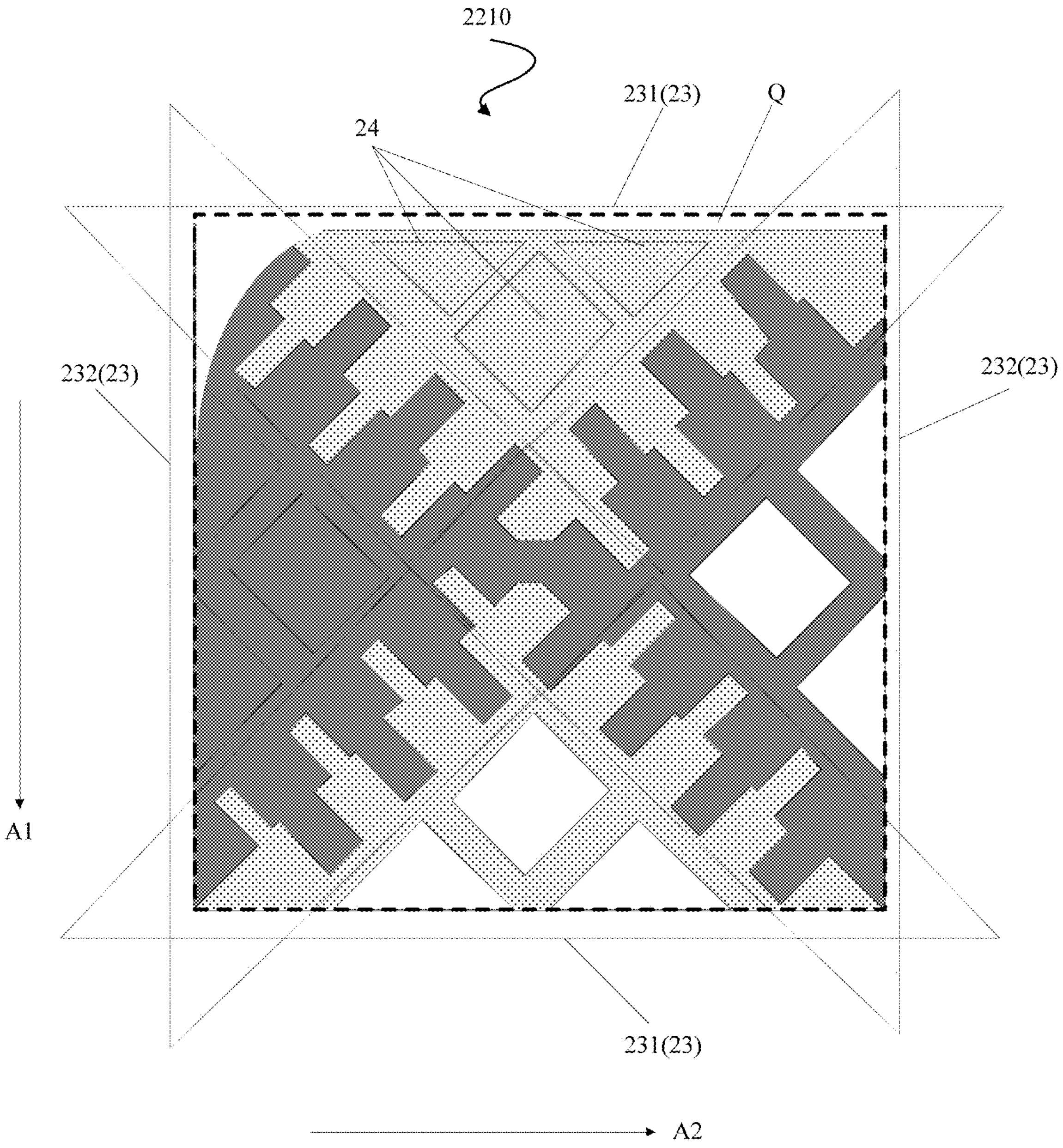
FIG. 11C is an enlarged schematic diagram of a missing touch pattern at an upper left corner of a touch display panel.

In one possible implementation, as shown in FIG. 11B and FIG. 11C, FIG. 11C is an enlarged schematic diagram of the first corner of the touch display panel in FIG. 11B at an intersection of the first edge B1 and the third edge B3. The touch display panel includes a first corner at the intersection of the first edge B1 and the third edge B3. The touch display panel includes the missing touch pattern 2210 adjacent to the first corner. In the first pattern sub-block 231 where the corner region is missing, at least one floating electrode 24 is electrically and integrally connected with the first pattern sub-block 231. In the second pattern sub-block 232 where the corner region is missing, at least one floating electrode 24 is integrally and electrically connected with the second pattern sub-block 232. Specifically, as shown in FIG. 11B and FIG. 11C, a region adjacent to the upper left corner where the first edge B1 and the third edge B3 intersect has a missing touch pattern 2210. In the missing touch pattern 2210, the first pattern sub-block 231 close to the third edge B3 has an edge missing and a corner missing; and the floating electrode 24 in the first pattern sub-block 231 can be integrally and electrically connected with the first pattern sub-block 231. In the missing touch pattern 2210, the second pattern sub-block 232 close the first edge B1 has a corner missing, and the floating electrode 24 in the second pattern sub-block 232 can be integrally and electrically connected with the second pattern sub-block 232.

Figure 11D:
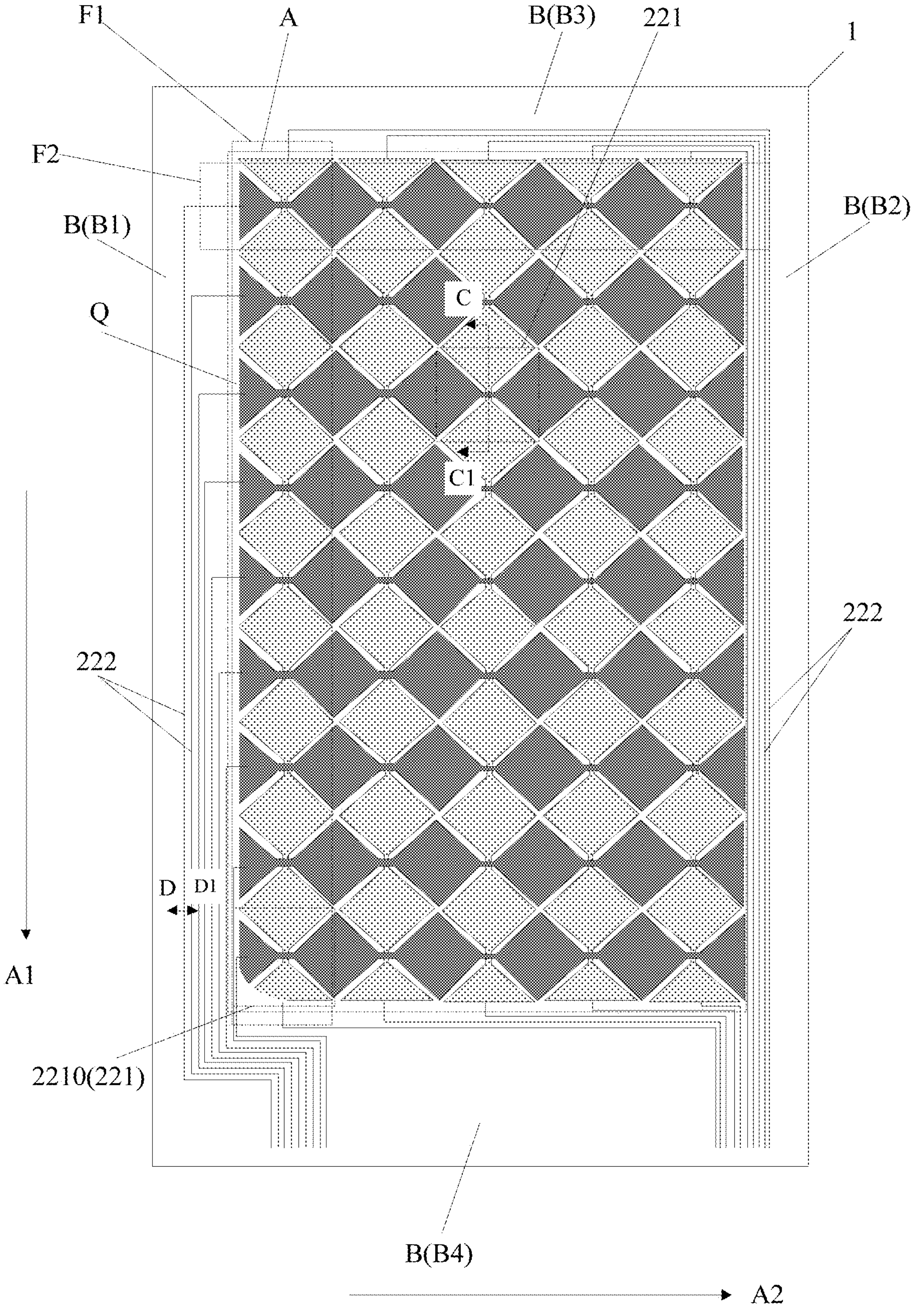
FIG. 11D is an overall schematic diagram of a missing touch pattern at a lower left corner of a touch display panel.
Figure 11E:
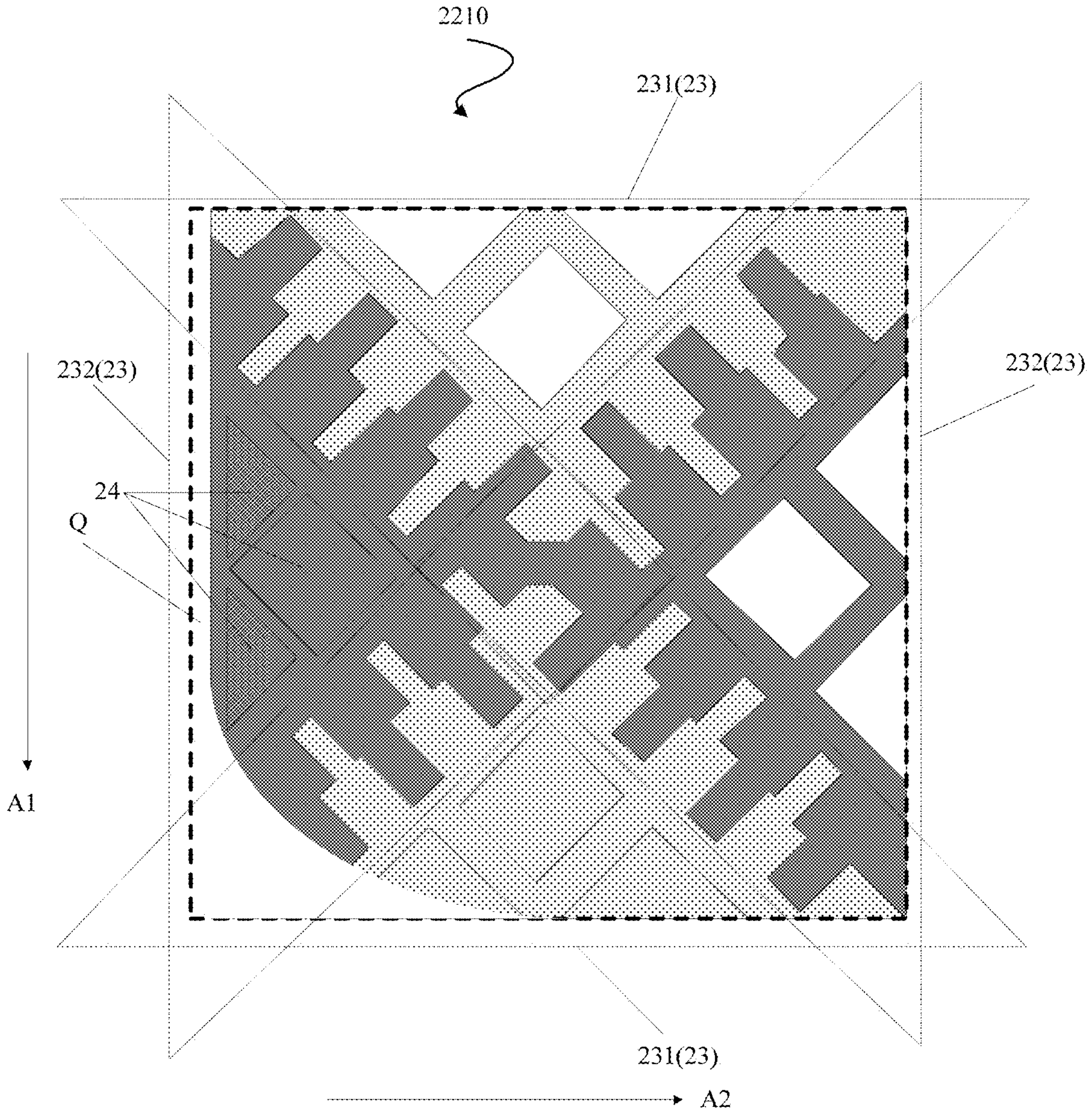
FIG. 11E is an enlarged schematic diagram of a missing touch pattern at a lower left corner of a touch display panel.

In one possible implementation, as shown in FIG. 11D and FIG. 11E, where FIG. 11E is an enlarged schematic diagram of the touch display panel in FIG. 11B at an intersection of the first edge B1 and the fourth edge B4. The touch display panel includes a second corner at the intersection of the first edge B1 and fourth edge B4. The touch display panel includes a missing touch pattern 2210 adjacent to the second corner. In the first pattern sub-block 231 where the corner region is missing, at least one floating electrode 24 is electrically and integrally connected with the first pattern sub-block 231. In the second pattern sub-block 232 where the corner region is missing, at least one floating electrode 24 is integrally and electrically connected with the second pattern sub-block 232. Specifically, as shown in FIG. 11D and FIG. 11E, a region adjacent to the lower left corner at the intersection of the first edge B1 and the fourth edge B4 has a missing touch pattern 2210. In the missing touch pattern 2210, the first pattern sub-block 231 close to the fourth edge B4 has a corner missing, and the floating electrode 24 in the first pattern sub-block 231 can be integrally and electrically connected with the first pattern sub-block 231. In the missing touch pattern 2210, the second pattern sub-block 232 close to the first edge B1 has an edge missing and a corner missing, and the floating electrode 24 in the second pattern sub-block 232 can be integrally and electrically connected with the second pattern sub-block 232.

Figure 11F:
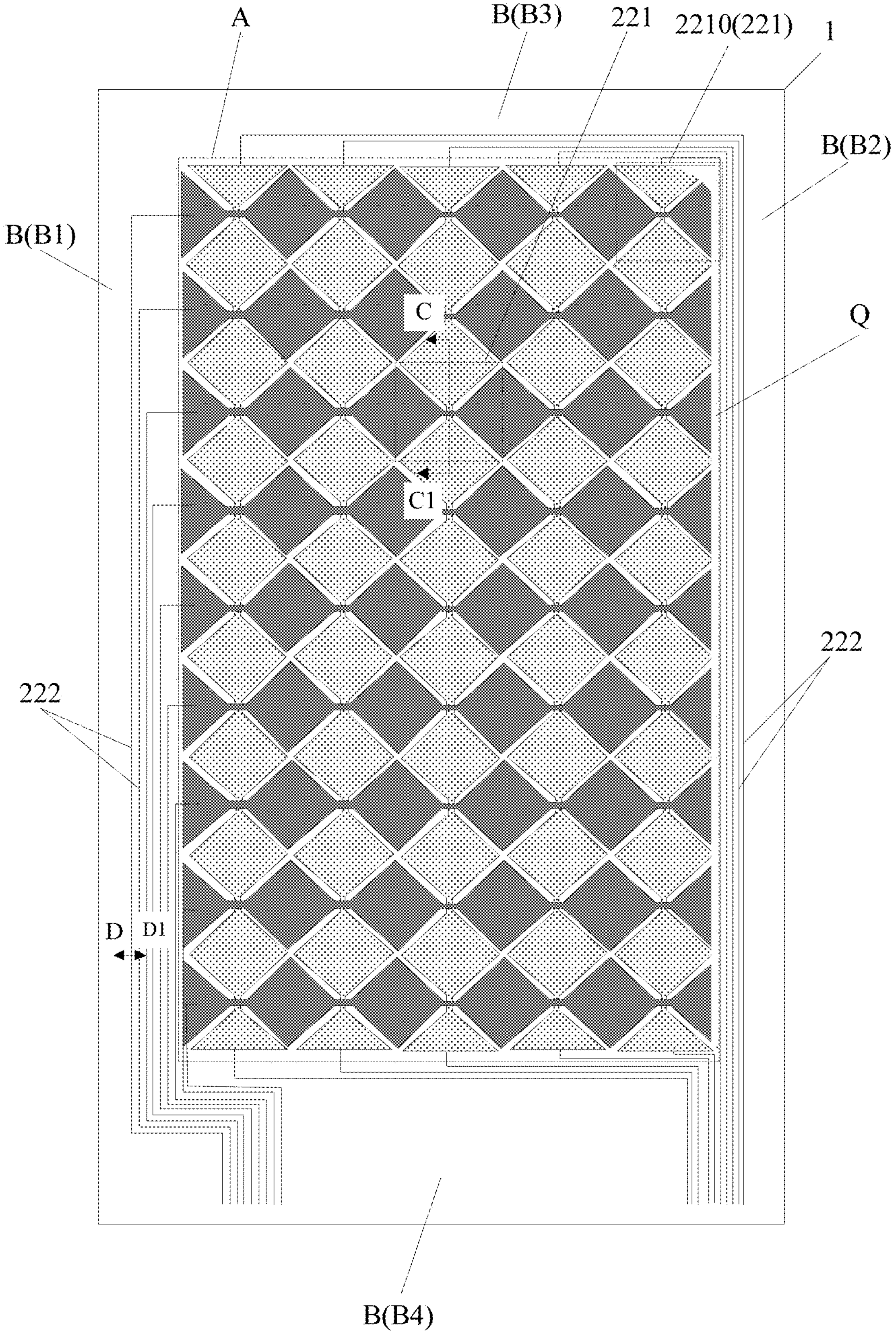
FIG. 11F is an overall schematic diagram of a missing touch pattern at an upper right corner of a touch display panel.
Figure 11G:
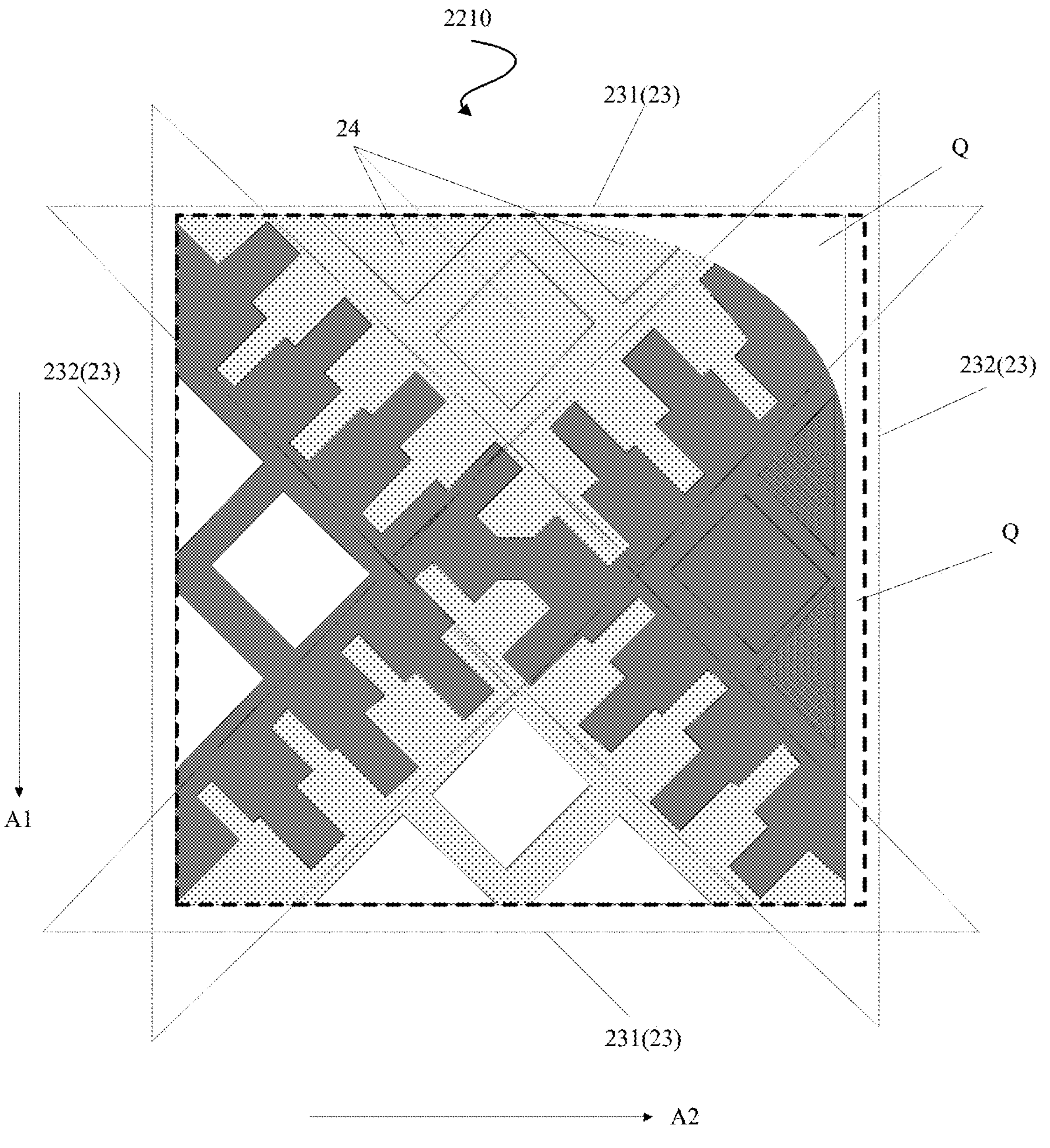
FIG. 11G is an enlarged schematic diagram of a missing touch pattern at an upper right corner of a touch display panel.
Figure 11H:
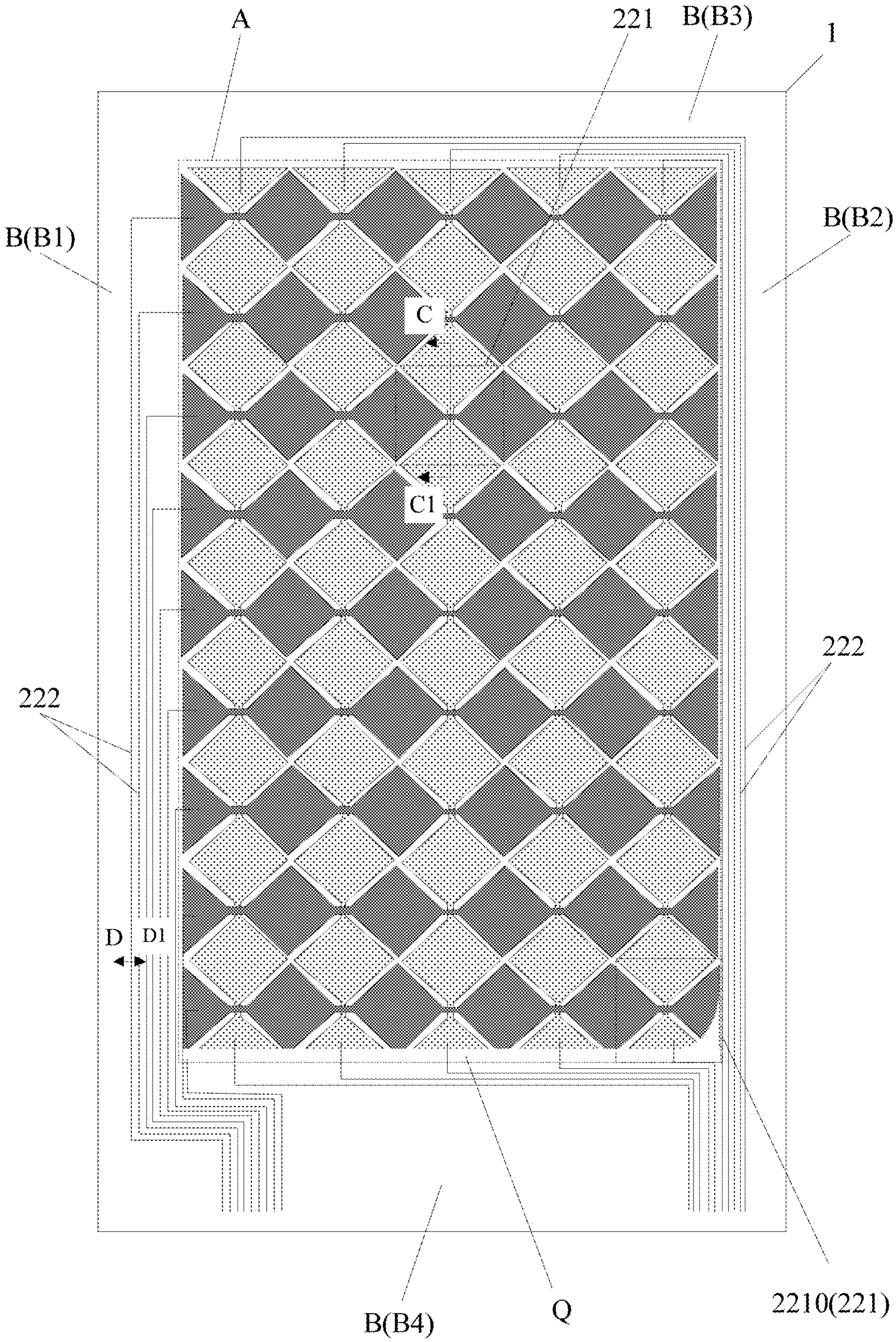
FIG. 11H is an overall schematic diagram of a missing touch pattern at a lower right corner of a touch display panel.

In one possible implementation, as shown in FIG. 11F and FIG. 11G, where FIG. 11G is an enlarged schematic diagram of the touch display panel in FIG. 11F at an intersection of the second edge B2 and the third edge B3. The touch display panel includes a third corner at the intersection of the second edge B2 and third edge B3. The touch display panel includes a missing touch pattern 2210 adjacent to the third corner. In the first pattern sub-block 231 where the corner region is missing, at least one floating electrode 24 is electrically and integrally connected with the first pattern sub-block 231. In the second pattern sub-block 232 where the corner region is missing, at least one floating electrode 24 is integrally and electrically connected with the second pattern sub-block 232. Specifically, as shown in FIG. 11F and FIG. 11G, a region adjacent to the upper right corner where the third edge B3 and the second edge B2 intersect has a missing touch pattern 2210. In the missing touch pattern 2210, the second pattern sub-block 232 close to the second edge B2 has an edge missing and a corner missing, and the floating electrode 24 in the second pattern sub-block 232 can be integrally and electrically connected with the second pattern sub-block 232. In the missing touch pattern 2210, the first pattern sub-block 231 close to the third edge B3 has an edge missing and a corner missing; and the floating electrode 24 in the first pattern sub-block 231 can be integrally and electrically connected with the first pattern sub-block 231.

In one possible implementation, as shown in FIG. 11H and FIG. 11A, where FIG. 11A is an enlarged schematic diagram of the touch display panel in FIG. 11H at an intersection of the second edge B2 and the fourth edge B4. The touch display panel includes a fourth corner at the intersection of the second edge B2 and fourth edge B4. The touch display panel includes a missing touch pattern 2210 adjacent to the fourth corner. In the first pattern sub-block 231 where the corner region is missing, at least one floating electrode 24 is electrically and integrally connected with the first pattern sub-block 231. In the second pattern sub-block 232 where the corner region is missing, at least one floating electrode 24 is integrally and electrically connected with the second pattern sub-block 232. Specifically, as shown in FIG. 11F and FIG. 11G, a region adjacent to the lower right corner where the fourth edge B4 and the second edge B2 intersect has a missing touch pattern 2210. In the missing touch pattern 2210, the first pattern sub-block 231 close to the fourth edge B4 has an edge missing and a corner missing; and the floating electrode 24 in the first pattern sub-block 231 can be integrally and electrically connected with the first pattern sub-block 231. In the missing touch pattern 2210, the second pattern sub-block 232 close to the third edge B3 has an edge missing and a corner missing, and the floating electrode 24 in the second pattern sub-block 232 can be integrally and electrically connected with the second pattern sub-block 232.

Figure 12A:
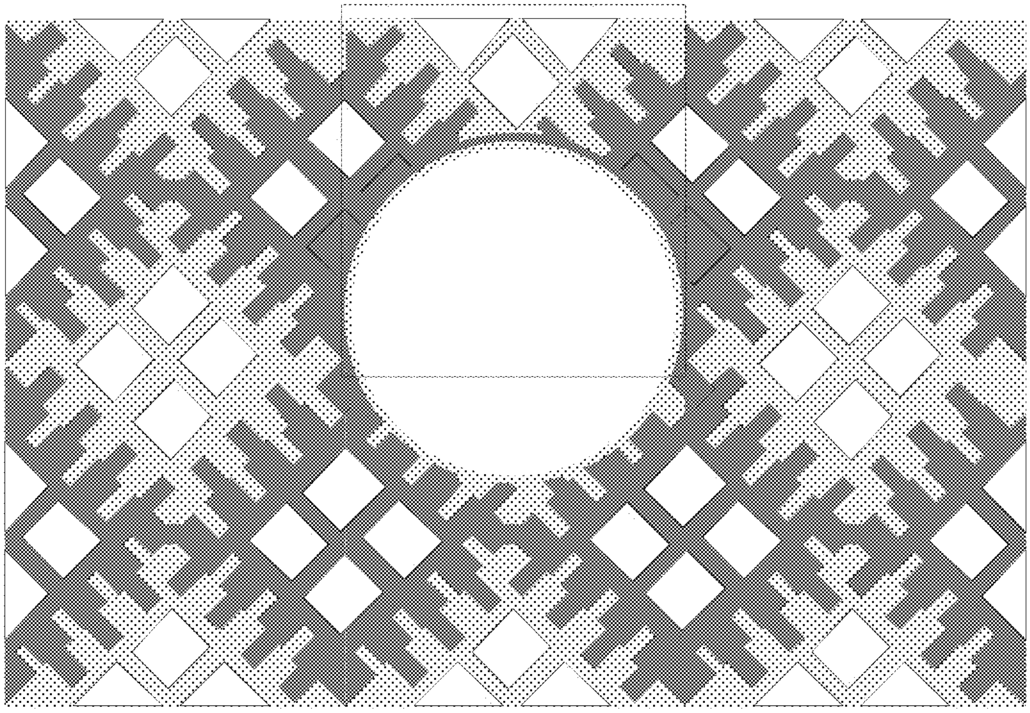
FIG. 12A is a schematic diagram of a missing touch pattern at a through hole.
Figure 12B:
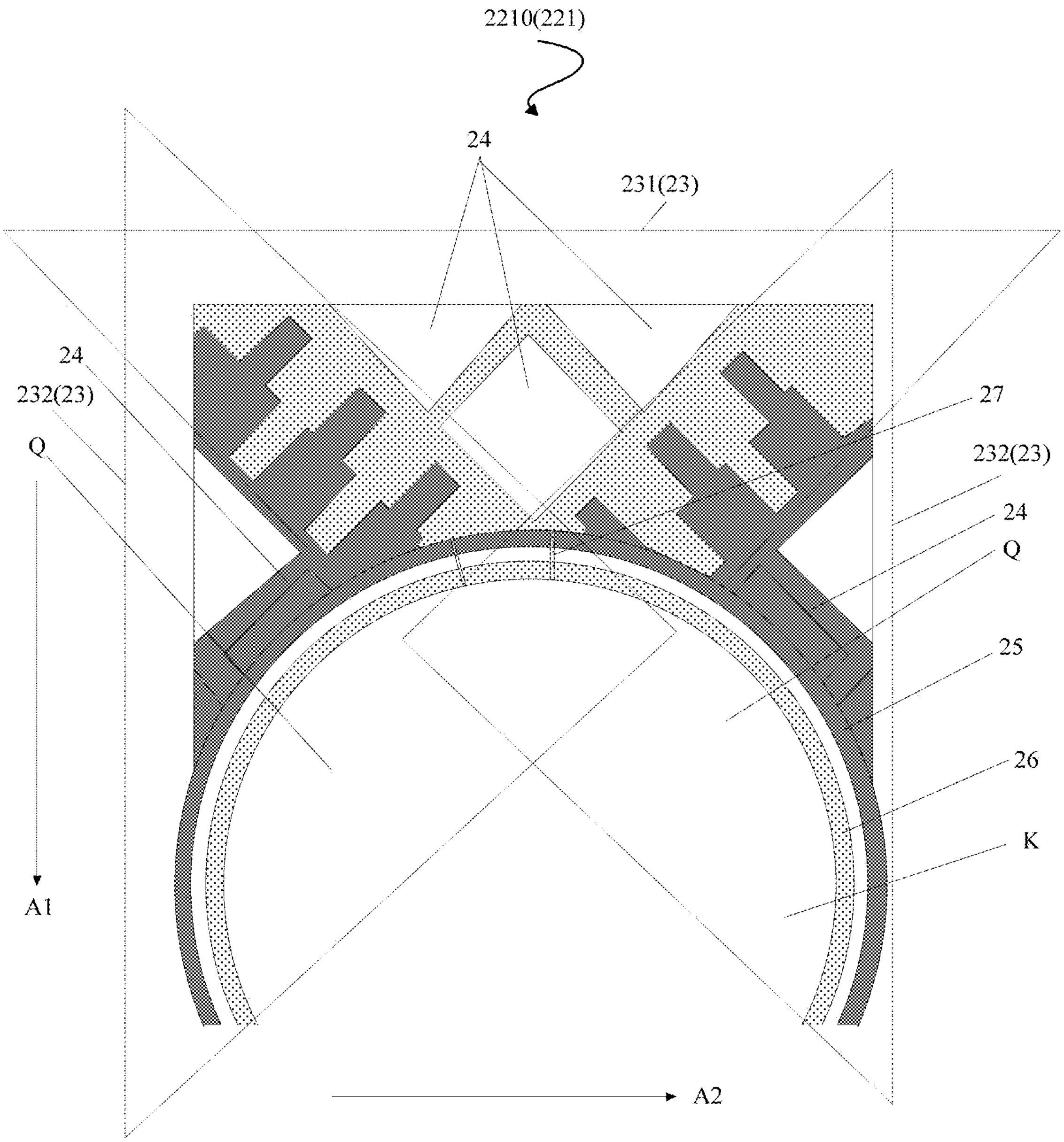
FIG. 12B is an enlarged schematic diagram of a dotted box in FIG. 12A.

In one possible implementation, as shown in FIG. 12A and FIG. 12B, where FIG. 12B is an enlarged structural schematic diagram of the touch display panel in FIG. 12A at the dotted box. The touch display panel includes a through hole K. The touch display panel includes the missing touch pattern 2210 adjacent to the through hole K. The missing touch pattern 2210 is located at a peripheral region of the through hole (that is, surrounding the through hole K) of the touch display panel. As shown in FIG. 12B, one first pattern sub-block 231 is completely missing, and portions of two second pattern sub-blocks 232 are missing. In the second pattern sub-block 232 where the missing region Q is located, at least one floating electrode 24 is integrally and electrically connected with the second pattern sub-block 232. In this way, the effective area of the missing touch pattern 2210 in peripheral region of the through hole can be compensated, and the self-capacity of the missing touch pattern 2210 in peripheral region of the through hole can be increased, thereby the electrical parameters of the missing touch pattern 2210 in the peripheral region of the through hole can be optimized, and the touch performance in peripheral region of the through hole can be improved. Specifically, the region where the through hole is located can be used to arrange cameras, sensors or other device structures. The missing touch pattern 2210 is located in the peripheral region of the through hole in the touch display panel, specifically, the peripheral region can be understood as the touch pattern 221 adjacent to the region where the through hole is located, part of the touch pattern 221 is used for drilling, resulting in the touch pattern 221 being partially missing.

In one possible implementation, the touch display panel includes a first compensation ring 26 located between the touch pattern 221 and the through hole K and surrounding the through hole K; and the first compensation ring 26 is electrically connected with the first pattern sub-blocks 231 on both sides of the through hole K. Since the missing touch pattern 2210 around the through hole K is more seriously missing and has poor electrical parameters, adding the first compensation ring 26 around the through hole K can compensate for the self-capacitance of the missing touch pattern 2210. Specifically, the first compensation ring 26 and the first pattern sub-blocks 231 on both sides of the through hole K may be electrically connected through the first connection part 27. The first compensation ring 26 and the first pattern sub-block 231 may be arranged in the same layer, and may both be arranged in the second metal layer 22. The first connection part 27 may be arranged in the first metal layer.

In one possible implementation, the touch display panel includes a second compensation ring 25 located between the first compensation ring 26 and the touch pattern 221 and surrounding the through hole K; and the second compensation ring 25 is electrically connected with the second pattern sub-blocks 232 on both sides of the through hole K. In this way, the self-capacitance of the missing pattern touch pattern 2210 can be compensated, and at the same time, the second pattern sub-blocks 232 on both sides of the through hole K can also be electrically connected with each other.

Specifically, the touch trace(s) 222 can be connected with the display region A from any edge of the screen and be electrically connected with the corresponding first touch electrode(s) F1 or the second touch electrode(s) F2. If the touch trace(s) 222 corresponding to the first touch electrode(s) F1 is connected with the display region from the lower side and/or the upper side of the screen and the touch trace(s) 222 is electrically connected with the first touch electrode(s) F1, then the touch trace(s) 222 corresponding to the second touch electrode(s) F2 can be connected with the display region from the left side and/or the right side of the screen, and the touch trace(s) 222 is electrically connected with the second touch electrode(s) F2. If the touch trace(s) 222 corresponding to the first touch electrode(s) F1 is connected with the display region from the left and/or right side of the screen, and the touch trace(s) 222 is connected with the first touch electrode(s) F1; then the touch trace(s) 222 corresponding to the second touch electrode F2 can be connected with the display region from the upper side and/or the lower side of the screen, and the touch trace(s) 222 is connected with the second touch electrode(s) F2. Specifically, for example, FIG. 1A shows a schematic diagram of that the touch traces 222 corresponding to the first touch electrodes F1 are connected with the display region from the third edge B3 and the fourth edge B4 to be electrically connected with the first touch electrodes F1, and the touch traces 222 corresponding to the second touch electrodes F2 are connected with the display region A from the first edge B1 to be electrically connected with the second touch electrodes F2. Specifically, for example, FIG. 1B shows a schematic diagram of that the touch traces 222 corresponding to the touch electrodes F1 are connected with the display region from the lower and upper sides of the screen to be electrically connected with the first touch electrodes F1, and the touch traces 222 corresponding to the second touch electrodes F2 can be connected with the display region from the left and/or right sides of the screen to be electrically connected with the second touch electrodes F2. As can be seen from FIG. 1A and FIG. 1B, the touch display panel consists of two parts: the touch pattern 221 (Sensor part) that forms electrical parameters in display region A, and the touch trace(s) 222 (Trace) that connects the external driving circuit IC and the sensor part in non-display region (trace region B). FIG. 3B shows a complete touch pattern 221. It can be seen from FIG. 1A, FIG. 1B and FIG. 3B that a touch pattern 221 consists of three parts: the first pattern sub-block 231 of the first touch electrode F1, the second pattern sub-block 232 of the second touch electrode F2, and the floating electrode 24. The touch patterns 221 are arranged in an array in the display region A.

Specifically, in embodiments of the present disclosure, as shown in FIG. 1B, the touch traces 222 corresponding to the first touch electrode F1 are connected with the display region from the lower and upper sides of the screen to be electrically connected with the first touch electrode F1. The touch trace 222 corresponding to the second touch electrode F2 can be connected with the display region from the left and right sides of the screen to be electrically connected with the second touch electrode F2. That is, in a 2T2R structure, the first touch electrode F1 is electrically connected with the external driving circuit IC from both sides of the screen, and the second touch electrode F2 is electrically connected with the external driving circuit IC from the other two sides of the screen, which can shorten the charging and feedback time of the touch display panel during touch detection, and make the recognition of the touch display panel faster and more sensitive.

Specifically, as shown in FIG. 1B, the display device provided by the embodiment of the present disclosure may include an external drive circuit IC, the first touch electrode(s) F1 is electrically connected with the external drive circuit IC through the corresponding touch trace(s) 222, and the second touch electrode(s) F2 is electrically connected with the external drive circuit IC through the corresponding touch trace(s) 222.

In one possible implementation, the touch display panel may further include a ground line GND and a shielded signal line GUA in the peripheral region B; and the shielded signal line GUA is provided at one or a combination of the following locations: between the first touch trace 223 and the second touch trace 224; between the first touch trace 223 and the ground line GND; or between the second touch trace 224 and the ground line GND.

In embodiments of the present disclosure, a shielded signal line GUA (Guard line) can be provided between different types of signal lines, so that the channel environment between two adjacent signal lines of different types is the same as the channel environment between two adjacent signal lines of the same type. Specifically, different types of signal lines may include: e.g., the ground line(s) GND and the touch trace(s) 222 (specifically, it may be the touch trace 222 corresponding to the first touch electrode F1, or it may also be the touch trace 222 corresponding to the second touch electrode F2), and different types of touch traces 222 may be e.g., the first touch trace 223 electrically connected with the first touch electrode F1, and the touch trace 224 electrically connected with the second touch electrode F2. Specifically, as shown in FIG. 1B, a shielded signal line GUA can be provided between the ground line GND and the touch trace 222, so that the channel environment between the ground line GND and the touch trace 222 is consistent with the channel environment between two second touch traces 224 that are adjacent to each other and are connected with the second touch electrodes F2 (as shown in FIG. 1B, the two second touch traces 224 on the left side that are electrically connected with different second touch electrodes F2 respectively).

It should be noted that in order to more clearly illustrate the various signal lines on the periphery of the touch display panel, FIG. 1B is only a schematic explanation based on the first touch electrode F1 including three first pattern sub-blocks 231, and the second touch electrode F2 including three second pattern sub-blocks 232. In some embodiments, the first touch electrode F1 may also include more first pattern sub-blocks 231, and the second touch electrode F2 may also include more second pattern sub-blocks 232, which not limited to this in the embodiments of the present disclosure. It should be noted that in order to clearly illustrate the first touch electrode(s) F1 and the second touch electrode(s) F2 in FIG. 1A, the floating electrode(s) 24 is not shown, which is not limited to this in the embodiments of the present disclosure. In a specific implementation, the arrangement method of the floating electrode 24 can be seen as shown in FIG. 3A and FIG. 3B.

Figure 13:
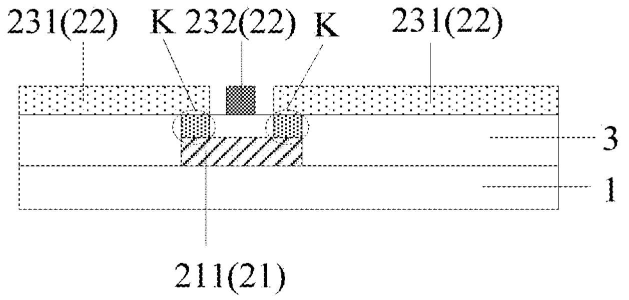
FIG. 13 is a schematic cross-sectional view along a dotted line C-C1 in FIG. 1A.

Specifically, as shown in FIG. 13, FIG. 13 is a schematic cross-sectional view along the dotted line C-C1 in FIG. 1A. The first metal layer 21 also includes a bridge portion 211, and the first pattern sub-blocks 231 that are adjacent to each other are electrically connected with each other through the bridge portion 211. The second pattern sub-blocks 232 that are adjacent to each other may be integrally and electrically connected with each other in the second metal layer 22.

Figure 3C:
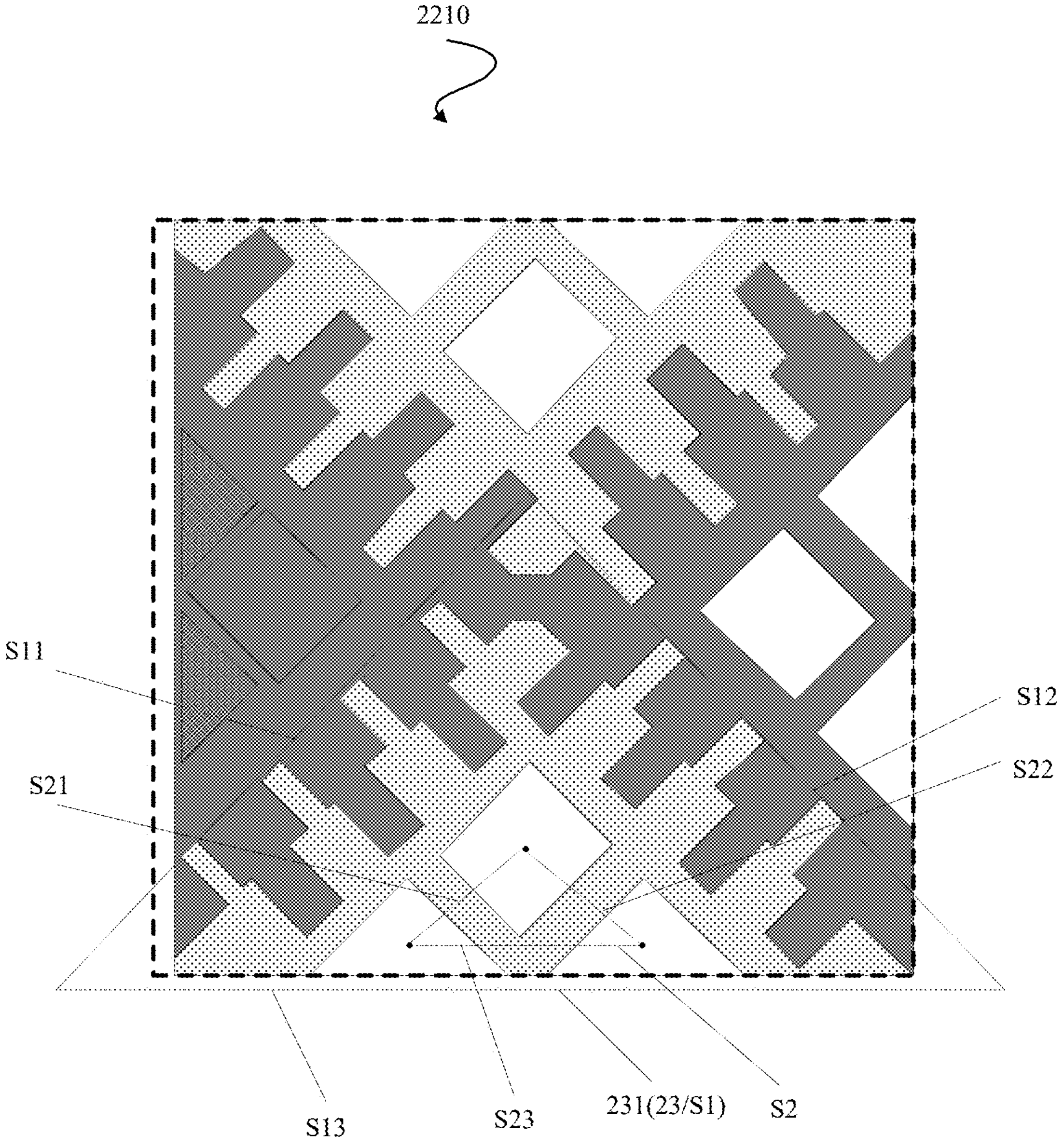
FIG. 3C is a schematic diagram of a corresponding relationship between pattern sub-blocks and floating electrodes.

In one possible implementation, as shown in FIG. 3C, the outer outline of the pattern sub-block 23 is a first triangle S1. Each of the pattern sub-blocks 23 includes a plurality of floating electrodes 24, and connecting lines between the centers of the plurality of floating electrodes 24 form a second triangle S2. The sides of the first triangle S1 and the sides of the second triangle S2 are approximately parallel. Specifically, for example, the first triangle S1 includes a first side S11, a second side S12, and a third side S13. The second triangle includes a fourth side S21, a fifth side S22, and a sixth side S23. The first side S11 is substantially parallel to the fourth side S21, the second side S12 is substantially parallel to the fifth side S22, and the third side S13 is substantially parallel to the sixth side S23. Specifically, the sides of the first triangle S1 and the sides of the second triangle S2 are approximately parallel, which can be understood as the angle between the extension lines of the corresponding sides being greater than or equal to 0 and less than or equal to 15 degrees.

In one possible implementation, a proportion of an area of a missing region of the missing touch pattern (e.g., an area of the missing region Q in FIG. 4) to an area of the missing touch pattern 2210 is greater than 0 and less than or equal to 40%. Specifically, a proportion of an area of a missing region of the missing touch pattern to an area of the missing touch pattern 2210 is greater than 10% and less than or equal to 30%. Specifically, a proportion of an area of a missing region of the missing touch pattern to an area of the missing touch pattern 2210 is greater than 15% and less than or equal to 25%.

In one possible implementation, in the touch patterns 221 other than the missing touch pattern(s) 2210, the floating electrodes 24 and the pattern sub-blocks 23 are insulated from each other.

Specifically, the pattern sub-block 23 can be composed of a plurality of metal grids that are electrically connected with each other, and the floating electrode 24 can also be composed of a plurality of metal grids that are electrically connected with each other. The electrical connection between the pattern sub-block 23 and the floating electrode 24 is achieved by electrically connecting the metal grids of the pattern sub-block 23 with the metal grids of the floating electrode 24. The insulation between pattern sub-block 23 and floating electrode 24 is achieved by disconnecting the metal grids of pattern sub-block 23 from the metal grids of floating electrode 24. Specifically, the pattern sub-block 23 and the floating electrode 24 may both be arranged in the same layer, e.g., may both be arranged in the second metal layer 22.

Specifically, the material of the first metal layer 21 may be stacked Ti—Al—Ti or stacked ITO-Ag-ITO. The material of the second metal layer 22 may be stacked Ti—Al—Ti or stacked ITO-Ag-ITO. As shown in FIG. 2, an insulating layer 3 may be arranged between the first metal layer 21 and the second metal layer 22, and the touch traces 22 may be electrically connected through the via holes penetrating the insulating layer 3 in some positions. The orthographic projection of the first touch sub-trace 2221 of the touch trace 22 on the base substrate 1 and the orthographic projection of the second touch sub-trace 2222 of the touch trace 22 on the base substrate 1 may substantially overlap with each other. Specifically, the "substantially overlap" can be understood as 80% to 100% overlap of the areas of the orthographic projections of the two.

In one possible implementation, as shown in FIG. 3B, in the same one touch pattern 221, the pattern sub-block 23 is provided with a plurality of protrusions 4 on its edge toward the other pattern sub-block 23; and the protrusions 4 include the first convex blocks 41 and the second convex blocks 42 arranged sequentially in a direction perpendicular to the edge. Specifically, the pattern sub-block 23 on the left side in FIG. 3B includes a plurality of protrusions 4, and the edge where the protrusions 4 are located is y, then in the direction perpendicular to y, the protrusion 4 includes a first protrusion block(s) 41 and a second protrusion block(s) 42 arranged in sequence, and the width k2 of the second protrusion block 42 in the direction parallel to the edge where the second protrusion block 42 is located is smaller than the width k1 of the first protrusion block 41 in the direction parallel to the edge where the first protruding block 41 is located.

Figure 14:
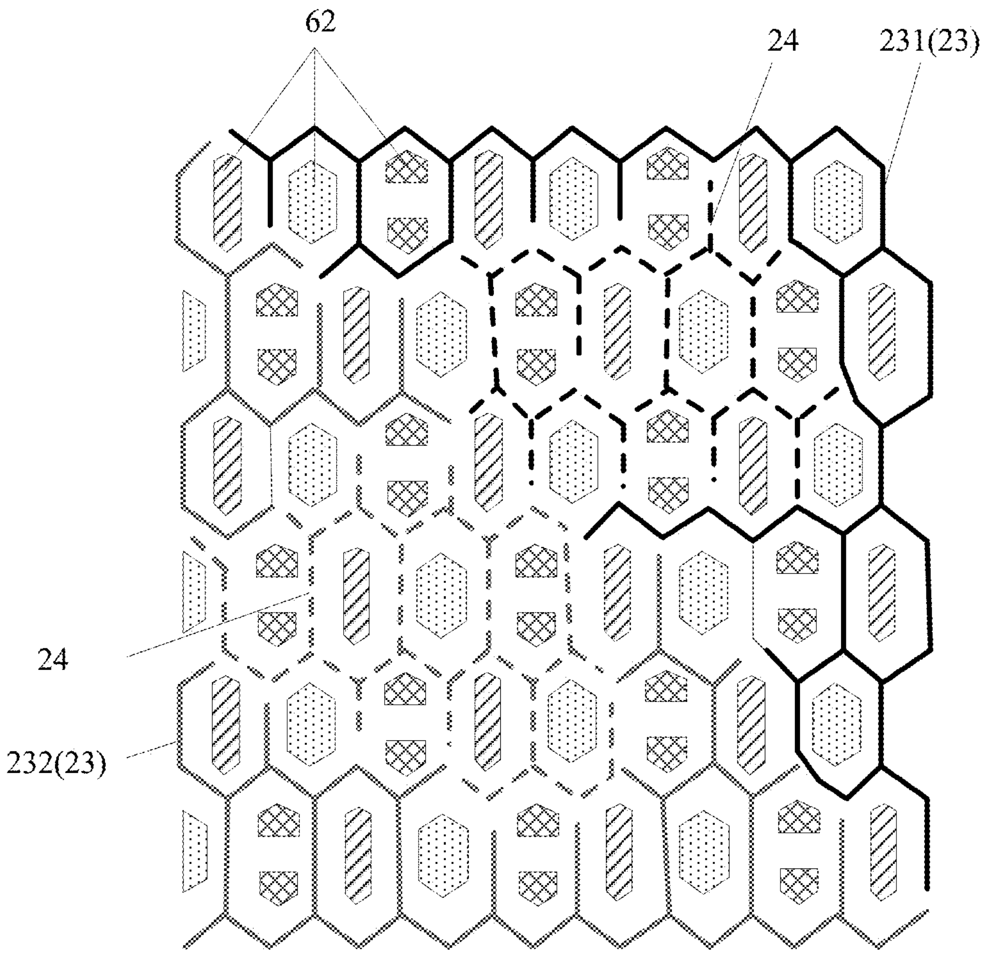
FIG. 14 is a schematic diagram of a distribution relationship between metal grids and pixels.

Specifically, the touch display panel may also include a display layer arranged between the base substrate 100 and the touch metal layer 2, and an encapsulation layer arranged on a side of the display layer facing away from the base substrate 1. Specifically, the display layer may include the light emitting devices. Specifically, as shown in FIG. 14, the light emitting devices include multiple anodes and a pixel definition layer with multiple pixel openings 62; where the metal grids including the pattern sub-block 23 and the floating electrode 24 correspond one-to-one with the pixel openings 62. The metal grids are located in the gaps among the pixels to avoid blocking the light emitted from the pixels.

Specifically, the display layer may include a driving layer for driving the light-emitting devices, and the driving layer may include pixel circuits for driving the light-emitting devices to emit light. The pixel circuit may specifically include the thin film transistors and the capacitors. The specific structure of the pixel circuit and light-emitting device may be the same as that in other display panels such as organic light-emitting display panels and quantum dot light-emitting display panels in the prior art, and will not be described in detail here.

In the specific implementation, in the embodiments of the present disclosure, the display device can be any product or component with display function, such as a mobile phone, tablet, TV, monitor, laptop, digital photo frame, navigation device, watch, wristband, etc. Other essential components of the display device should be understood by those of ordinary skill in the art and will not be described in detail here, nor should they be used to limit the present disclosure.

Embodiments of the present disclosure also provide a display device, which includes the touch display panel as provided in embodiments of the present disclosure.

In the embodiments of the present disclosure, for the touch pattern 221 with the partial missing region Q, in the pattern sub-block 23 where the missing region Q is located, at least one floating electrode 24 is electrically and integrally connected with the pattern sub-block 23 to compensate for the effective area of the touch pattern 221 on the edge, which can improve the self-capacitance of the missing touch pattern 2210 which is incomplete, optimize the electrical parameters of the missing touch pattern 2210 at the screen edge, and improve the touch performance of the screen edge.

Although the preferred embodiments of the present disclosure have been described, those skilled in the art will be able to make additional changes and modifications to these embodiments once the basic inventive concepts are apparent. Therefore, it is intended that the appended claims be construed to include the preferred embodiments and all changes and modifications that fall within the scope of the present disclosure.

Apparently, those skilled in the art can make various modifications and variations to embodiments of the present disclosure without departing from the spirit and scope of embodiments of the present disclosure. In this way, if the modifications and variations of embodiments of the present disclosure fall within the scope of the claims of the present disclosure and their equivalent technologies, the present disclosure is also intended to include these modifications and variations.

What is claimed is:

1. A touch display panel, comprising:

a base substrate, comprising a display region and a peripheral region surrounding the display region; and a touch metal layer, comprising touch patterns at least partially of which is in the display region, and touch traces in the peripheral region; wherein:

each of the touch pattern comprises a plurality of pattern sub-blocks;

at least one floating electrode is provided in each of the plurality of pattern sub-block;

a touch pattern, of the touch patterns, with a partial missing region is regarded as a missing touch pattern; and in a pattern sub-block where the missing region is located, the at least one floating electrode is integrally and electrically connected with the pattern sub-block;

wherein in one touch pattern, the pattern sub-block is provided with a plurality of protrusions on an edge of the pattern sub-block toward another pattern sub-block; and the plurality of protrusions comprise a first convex block and a second convex block arranged sequentially in a direction perpendicular to the edge;

wherein a width of the second convex block in a direction parallel to the edge is smaller than a width of the first convex block in the direction parallel to the edge;

wherein the plurality of pattern sub-blocks comprise two first pattern sub-blocks arranged in sequence along a first direction and electrically connected with each other, and two second pattern sub-blocks arranged in sequence along a second direction and electrically connected with each other;

first pattern sub-blocks of different touch patterns in a same arrangement direction parallel to the first direction are electrically connected to form a first touch electrode; and second pattern sub-blocks of different touch patterns in a same arrangement direction parallel to the second direction are electrically connected to form a second touch electrode;

wherein the touch trace comprises a first touch trace electrically connected with the first touch electrode, and a second touch trace electrically connected with the second touch electrode.

2. The touch display panel of claim 1, wherein in the missing touch pattern, a pattern in an edge region at a side of a first pattern sub-block facing away from the other first pattern sub-block is missing; and in the first pattern sub-block where the missing region is located, the at least one floating electrode is integrally and electrically connected with the first pattern sub-block.

3. The touch display panel of claim 1, wherein in the missing touch pattern, a pattern in an edge region at a side of the second pattern sub-block facing away from the other second pattern sub-block is missing; and in the second pattern sub-block where the missing region is located, the at least one floating electrode is integrally and electrically connected with the second pattern sub-block.

4. The touch display panel of claim 2, wherein in the missing touch pattern, a corner region at the side of the first pattern sub-block facing away from the other first pattern sub-block is missing, or, a corner region at the side of the second pattern sub-block facing away from the other second pattern sub-block is missing; and in the first pattern sub-block where the corner region is missing, the at least one floating electrode is integrally and electrically connected with the first pattern sub-block; and in the second pattern sub-block where the corner region is missing, the at least one floating electrode is integrally and electrically connected with the second pattern sub-block.

5. The touch display panel of claim 1, wherein the peripheral region comprises a plurality of edges; the plurality of edges comprises: a first edge and a second edge extending along the first direction, a third edge extending along the second direction and connected with one end of the first edge and one end of the second edge, and a fourth edge extending along the second direction and connected with the other end of the first edge and the other end of the second edge;

the touch display panel comprises a plurality of missing touch patterns adjacent to at least one edge, and the plurality of missing touch patterns are arranged sequentially along the at least one edge adjacent to the plurality of missing touch patterns; missing regions in different missing touch patterns are arranged sequentially along the at least one edge adjacent to the different missing touch patterns.

6. The touch display panel of claim 5, comprising: a plurality of missing touch patterns adjacent to the first edge;

the plurality of missing touch patterns are arranged in sequence along the first direction; and the missing regions in different missing touch patterns are arranged in sequence along the first direction.

7. The touch display panel of claim 5, comprising: a plurality of missing touch patterns adjacent to the second edge;

the plurality of missing touch patterns are arranged in sequence along the first direction; and the missing regions in different missing touch patterns are arranged in sequence along the first direction.

8. The touch display panel of claim 5, comprising: a plurality of missing touch patterns adjacent to the third edge;

the plurality of missing touch patterns are arranged in sequence along the second direction; and the missing regions in different missing touch patterns are arranged in sequence along the second direction.

9. The touch display panel of claim 5, comprising: a plurality of missing touch patterns adjacent to the fourth edge;

the plurality of missing touch patterns are arranged in sequence along the second direction; and the missing regions in different missing touch patterns are arranged in sequence along the second direction.

10. The touch display panel of claim 5, comprising: a first corner at an intersection of the first edge and the third edge; and a missing touch pattern adjacent to the first corner.

11. The touch display panel of claim 5, comprising: a second corner at an intersection of the first edge and the fourth edge; and a missing touch pattern adjacent to the second corner.

12. The touch display panel of claim 5, comprising: a third corner at an intersection of the second edge and the third edge; and a missing touch pattern adjacent to the third corner.

13. The touch display panel of claim 5, comprising: a fourth corner at an intersection of the second edge and the fourth edge; and a missing touch pattern adjacent to the fourth corner.

14. The touch display panel of claim 1, comprising: a through hole; and a missing touch pattern adjacent to the through hole;

wherein in the missing touch pattern adjacent to the through hole, one first pattern sub-block is entirely missing, and partial region of two second pattern sub-blocks are missing; and in the second pattern sub-block where the missing region is located, the at least one floating electrode is integrally and electrically connected with the second pattern sub-block.

15. The touch display panel of claim 14, comprising: a first compensation ring located between the missing touch pattern and the through hole and surrounding the through hole; and the first compensation ring is electrically connected with first pattern sub-blocks on both sides of the through hole.

16. The touch display panel of claim 15, comprising: a second compensation ring located between the first compensation ring and the missing touch pattern and surrounding the through hole; and the second compensation ring is electrically connected with second pattern sub-blocks on both sides of the through hole.

17. The touch display panel of claim 1, wherein a proportion of an area of a missing region of the missing touch pattern to an area of the missing touch pattern is greater than 0 and less than or equal to 40%.

18. A display device, comprising the touch display panel of claim 1.

* * * * *